United States Patent
Seo et al.

(10) Patent No.: US 11,129,149 B2
(45) Date of Patent: *Sep. 21, 2021

(54) METHOD AND APPARATUS FOR TRANSMITTING UPLINK CONTROL INFORMATION IN WIRELESS COMMUNICATION SYSTEM

(71) Applicant: LG ELECTRONICS INC., Seoul (KR)

(72) Inventors: Dong Youn Seo, Anyang-si (KR); Joon Kui Ahn, Anyang-si (KR); Suck Chel Yang, Anyang-si (KR); Yun Jung Yi, Anyang-si (KR)

(73) Assignee: LG Electronics Inc., Seoul (KR)

(*) Notice: Subject to any disclaimer, the term of this patent is extended or adjusted under 35 U.S.C. 154(b) by 4 days.

This patent is subject to a terminal disclaimer.

(21) Appl. No.: 16/735,369

(22) Filed: Jan. 6, 2020

(65) Prior Publication Data

US 2020/0145988 A1    May 7, 2020

Related U.S. Application Data

(63) Continuation of application No. 15/880,119, filed on Jan. 25, 2018, now Pat. No. 10,568,074, which is a
(Continued)

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/0026* (2013.01); *H04L 1/1671* (2013.01);
(Continued)

(58) Field of Classification Search
CPC ............ H04W 72/0413; H04W 72/042; H04L 1/1896; H04L 1/1692; H04L 1/1861;
(Continued)

(56) References Cited

U.S. PATENT DOCUMENTS

2011/0080880 A1    4/2011  Yin et al.
2011/0268028 A1*  11/2011  Stern-Berkowitz ......................... H04L 5/0048
                                                                      370/328
(Continued)

FOREIGN PATENT DOCUMENTS

CN    102104972    6/2011
CN    102113241    6/2011
(Continued)

OTHER PUBLICATIONS

Pantech, "Remaining details for UCI transmission on PUCCH," 3GPP TSG RAN1 #65, R1-111644, May 2011, 3 pages.
(Continued)

*Primary Examiner* — Mang Hang Yeung
(74) *Attorney, Agent, or Firm* — Lee, Hong, Degerman, Kang & Waimey

(57) ABSTRACT

Provided are a method and an apparatus for transmitting uplink control information performed by a user equipment in a wireless communication system. The method comprises the steps of: receiving a first parameter for indicating whether to simultaneously transmit a first combination of an acknowledgement/negative-acknowledgement (ACK/NACK) and a channel quality indicator (CQI), and a second parameter for indicating whether to multiplex a second combination of an ACK/NACK and the CQI and transmitting same as a second physical uplink control channel (PUCCH) format; and multiplexing the first combination of the ACK/NACK or the second combination of ACK/NACK with the CQI and transmitting same as a first PUCCH format
(Continued)

or the second PUCCH format, based on the first parameter and the second parameter.

16 Claims, 19 Drawing Sheets

Related U.S. Application Data continuation of application No. 15/405,272, filed on Jan. 12, 2017, now Pat. No. 9,918,303, which is a continuation of application No. 14/372,193, filed as application No. PCT/KR2013/000381 on Jan. 17, 2013, now Pat. No. 9,584,287.

(60) Provisional application No. 61/706,766, filed on Sep. 28, 2012, provisional application No. 61/706,095, filed on Sep. 26, 2012, provisional application No. 61/679,064, filed on Aug. 2, 2012, provisional application No. 61/650,986, filed on May 23, 2012, provisional application No. 61/646,245, filed on May 11, 2012, provisional application No. 61/645,614, filed on May 10, 2012, provisional application No. 61/594,386, filed on Feb. 3, 2012, provisional application No. 61/587,626, filed on Jan. 17, 2012.

(51) Int. Cl.
  *H04L 1/16* (2006.01)
  *H04L 1/18* (2006.01)
  *H04L 1/00* (2006.01)
  *H04L 5/00* (2006.01)
  *H04L 5/14* (2006.01)

(52) U.S. Cl.
  CPC .......... *H04L 1/1692* (2013.01); *H04L 1/1861* (2013.01); *H04L 1/1896* (2013.01); *H04L 5/0055* (2013.01); *H04L 5/0057* (2013.01); *H04L 5/14* (2013.01); *H04L 1/0031* (2013.01); *H04L 1/0073* (2013.01); *H04L 1/1614* (2013.01); *H04L 5/0023* (2013.01); *H04W 72/042* (2013.01)

(58) Field of Classification Search
  CPC ....... H04L 5/0055; H04L 5/0057; H04L 5/14; H04L 1/0026; H04L 1/1671; H04L 5/0023; H04L 1/0073; H04L 1/1614; H04L 1/0031; H04L 1/18; H04L 5/0053
  USPC ......................................................... 370/329
  See application file for complete search history.

(56) References Cited

U.S. PATENT DOCUMENTS

| | | | | |
|---|---|---|---|---|
| 2012/0113832 | A1* | 5/2012 | Montojo | H04L 1/1671 370/252 |
| 2013/0176957 | A1* | 7/2013 | Gao | H04L 5/0007 370/329 |
| 2014/0362797 | A1* | 12/2014 | Aiba | H04L 1/1861 370/329 |
| 2014/0376424 | A1* | 12/2014 | Seo | H04L 5/0057 370/280 |
| 2017/0135092 | A1 | 5/2017 | Seo et al. | |
| 2018/0167934 | A1 | 6/2018 | Seo et al. | |

FOREIGN PATENT DOCUMENTS

| | | |
|---|---|---|
| EP | 2385650 | 11/2011 |
| JP | 2011-223094 | 11/2011 |
| JP | 2013-128202 | 6/2013 |
| KR | 10-2011-0074499 | 6/2011 |
| KR | 10-2011-0113128 | 10/2011 |
| WO | 2010087674 | 8/2010 |
| WO | 2011041623 | 4/2011 |
| WO | 2011/085230 | 7/2011 |
| WO | 2011112004 A2 | 9/2011 |
| WO | 2011112004 A3 | 9/2011 |
| WO | 2011140509 | 11/2011 |
| WO | 2011/147263 | 12/2011 |
| WO | 2012005516 | 1/2012 |

OTHER PUBLICATIONS

ZTE, "Multiplexing of periodic CSI and ACK/NACK on PUCCH," 3GPP TSG RAN WG1 Meeting #63bis, R1-110164, Jan. 2011, 7 pages.
ZTE, "Remaining Open issues of Simultaneous transmission of UL Channels/Signals," 3GPP TSG RAN WG1 Meeting #63bis, R1-110165, Jan. 2011, 3 pages.
Qualcomm Inc., "Clarification of parallel PUCCH and PUSCH transmission," 3GPP TSG-RAN WG1 #65, R1-111803, May 2011, 4 pages.
European Patent Office Application Serial No. 13739031.6, Search Report dated Jun. 19, 2015, 6 pages.
Chinese Patent Office Application No. 201380013873.X, Office Action dated Nov. 30, 2016, 5 pages.
State Intellectual Property Office of the People's Republic of China Application Serial No. 201810015573.X, Office Action dated May 11, 2020, 10 pages.
PCT International Application No. PCT/KR2013/000381, Written Opinion of the International Searching Authority dated Apr. 23, 2013, 1 page.
Texas Instruments, "Multiplexing Periodic CSI and HARQ-ACK on PUCCH," 3GPP TSG RAN WG1 #68bis, R1-121204, Mar. 2012, 4 pages.
LG Electronics, "Simultaneous transmission of HARQ-ACK and CSI on PUCCH format 3," 3GPP TSG RAN WG1 Meeting #68bis, R1-121416, Mar. 2012, 4 pages.
Samsung, "PUCCH HARQ-ACK Resource Indexing for DL CA," 3GPP TSG RAN WG1 #60bis, R1-102171, Apr. 2010, 5 pages.
Japan Patent Office Application Serial No. 2014-553252, Office Action dated Jul. 28, 2015, 4 pages.

* cited by examiner

METHOD AND APPARATUS FOR TRANSMITTING UPLINK CONTROL INFORMATION IN WIRELESS COMMUNICATION SYSTEM

CROSS-REFERENCE TO RELATED APPLICATIONS

This application is a continuation of U.S. application Ser. No. 15/880,119, filed on Jan. 25, 2018, currently pending, which is a continuation of U.S. application Ser. No. 15/405,272, filed on Jan. 12, 2017, now U.S. Pat. No. 9,918,303, which is a continuation of U.S. application Ser. No. 14/372,193, filed on Jul. 14, 2014, now U.S. Pat. No. 9,584,287, which is the National Stage filing under 35 U.S.C. 371 of International Application No. PCT/KR2013/000381, filed on Jan. 17, 2013, which claims the benefit of U.S. Provisional Application No. 61/587,626, filed on Jan. 17, 2012, 61/594,386, filed on Feb. 3, 2012, 61/645,614, filed on May 10, 2012, 61/646,245, filed on May 11, 2012, 61/650,986, filed on May 23, 2012, 61/679,064, filed on Aug. 2, 2012, 61/706,095, filed on Sep. 26, 2012, and 61/706,766, filed on Sep. 28, 2012, the contents of which are all hereby incorporated by reference herein in their entirety.

BACKGROUND OF THE INVENTION

Field of the Invention

The present invention relates to wireless communication, and more particularly, to a method and an apparatus for transmitting uplink control information in a wireless communication system.

Related Art

In a wideband wireless communication system, effective transmission and reception techniques and utilization measures have been proposed in order to maximize efficiency of limited radio resources. One of systems considered as a next-generation wireless communication system is an orthogonal frequency division multiplexing (OFDM) system that can attenuate an inter-symbol interference (ISI) effect with low complexity. In the OFDM, a data symbol input in series is converted into N parallel data symbols which are loaded on N separated subcarriers to be transmitted, respectively. The subcarriers maintain orthogonality in respect of a frequency. Respective orthogonal channels undergo independent frequency selective fading, and as a result, complexity in a receiver is decreased and an interval of transmitted symbols is increased to minimize inter-symbol interference.

Orthogonal frequency division multiple access (hereinafter, referred to as OFDMA) represents a multiple access method that implements a multiple access by independently some of usable subcarriers to each user in a system using the OFDM as a modulation scheme. The OFDMA provides frequency resources such as the subcarriers to each user and the respective frequency resources are independently provided to a plurality of users not to be overlapped with each other, in general. Consequently, the frequency resources are exclusively allocated for each user. In the OFDMA system, frequency diversity for multiple users may be acquired through frequency selective scheduling and the subcarriers may be allocated in various patterns according to a permutation scheme for the subcarriers. In addition, efficiency of a spatial area may be increased by a space multiplexing technique using multiple antennas.

Multiple-input multiple-output (MIMO) technology improves transmission and reception efficiency of data by using multiple transmitting antennas and multiple receiving antennas. A technique for implementing diversity in an MIMO system includes a space frequency block code (SFBC), a space time block code (STBC), cyclic delay diversity (CDD), frequency switched transmit diversity (FSTD), time switched transmit diversity (TSTD), precoding vector switching (PVS), spatial multiplexing (SM), and the like. An MIMO channel matrix depending on the number of receiving antennas and the number of transmitting antennas may be dissolved into a plurality of independent channels. The respective independent channels are called layers or streams. The number of layers represents a rank.

Uplink control information (UCI) may be transmitted through a physical uplink control channel (PUCCH). The uplink control information may include various types of information including a scheduling request (SR), an acknowledgement/non-acknowledgement (ACK/NACK) signal, a channel quality indicator (CQI), a precoding matrix indicator (PMI), a rank indicator (RI), and the like. The PUCCH transports various types of control information according to a format.

In recent years, a carrier aggregation system attracts attention. The carrier aggregation system means a system that configures a wideband by collecting one or more subcarriers having a smaller bandwidth than a target wideband when the wireless communication system supports the wideband.

In the carrier aggregation system, a method for efficiently and reliably transmitting various types of uplink control information is required.

SUMMARY OF THE INVENTION

The present invention provides a method and an apparatus for transmitting uplink control information in a wireless communication system.

In one aspect, provided is a method for transmitting uplink control information (UCI) performed by user equipment in a wireless communication system. The method includes: receiving a first parameter for indicating whether to simultaneously transmit a first combination of an acknowledgment/no-acknowledgement (ACK/NACK) and a channel quality indicator (CQI) and a second parameter for indicating whether to multiplex a second combination of an ACK/NACK and the CQI and transmit the multiplexed second combination in a second physical uplink control channel (PUCCH) format; and multiplexing the first combination of the ACK/NACK or the second combination of the ACK/NACK with the CQI and transmitting the multiplexed ACK/NACK and CQI through a first PUCCH format or the second PUCCH format.

In another aspect, provided is a user equipment. The user equipment includes: method includes: a radio frequency (RF) unit transmitting or receiving a radio signal; and a processor connected with the RF unit, wherein the processors receives a first parameter for indicating whether to simultaneously transmit a first combination of an acknowledgment/no-acknowledgement (ACK/NACK) and a channel quality indicator (CQI) and a second parameter for indicating whether to multiplex a second combination of an ACK/NACK and the CQI and transmit the multiplexed second combination in a second physical uplink control channel (PUCCH) format, and multiplexes the first combination of the ACK/NACK or the second combination of the ACK/NACK with the CQI and transmits the multiplexed ACK/NACK and CQI through a first PUCCH format or the second PUCCH format.

When different types of uplink control information (UCI) needs to be transmitted in the same subframe, the uplink control information may be efficiently multiplexed and transmitted.

DESCRIPTION OF EXEMPLARY EMBODIMENTS

Figure 1:
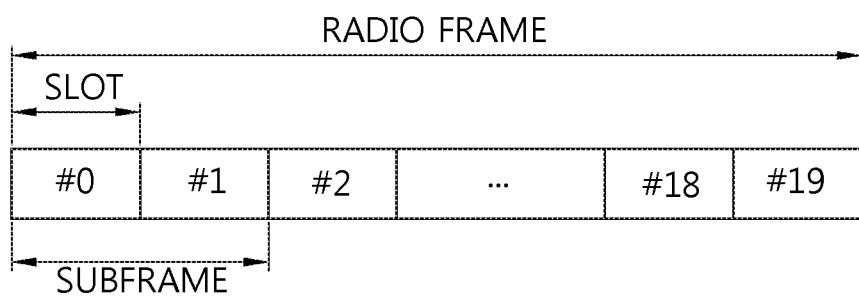
FIG. 1 illustrates a structure of a radio frame in 3GPP LTE.

Technology described below may be used in various wireless communication systems including code division multiple access (CDMA), frequency, division multiple access (FDMA), time division multiple access (TDMA), orthogonal frequency division multiple access (OFDMA), single carrier-FDMA (SC-FDMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. IEEE 802.16m as the evolution of IEEE 802.16e provides backward compatibility with a system based on the IEEE 802.16e. The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE. The LTE/LTE-A is primarily described for clear description, but the spirit of the present invention is not limited thereto.

The wireless communication system includes at least one base station (BS). Each base station provides a communication service to a specific geographical region. User equipment (UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station generally represents a fixed station that communicates with a terminal, and may be called different terms such as an evolved-NodeB (eNB), a base transceiver system (BTS), an access point, and the like.

The user equipment generally belongs to one cell and the cell to which the terminal belongs is referred to as a serving cell. A base station that provides the communication service to the serving cell is referred to as a serving BS. The serving base station may provide one or a plurality of serving cells.

The technology may be used in a downlink or an uplink. In general, the downlink means communication from the base station to the terminal and the uplink means communication from the terminal to the base station.

Layers of a radio interface protocol between the terminal and the base station may be divided into a first layer (L1), a second layer (L2), and a third layer (L3) based on three lower layers of an open system interconnection (OSI) model which is widely known in a communication system.

A physical layer as the first layer is connected with a medium access control (MAC) layer which is a higher layer through a transport channel and data moves between the MAC layer and the physical layer through the transport channel. In addition, data moves between different physical layers, that is, between physical layers at a transmitter and a receiver through a physical channel.

A radio data link layer as the second layer is constituted by the MAC layer, an RLC layer, and a PDCP layer. The MAC layer as a layer that takes charge of mapping a logic channel and the transport channel selects an appropriate transport channel in order to transmit data transferred from the RLC layer and adds required control information to a header of an MAC protocol data unit (PDU).

The RLC layer is positioned on a layer upper than the MAC layer to support reliable transmission of data. Further, the RLC layer segments and concatenates RLC service data units (SDUs) transferred from the higher layer in order to configure data having an appropriate size suitable for a radio interval. The RLC layer of a receiver supports a reassembling function of data in order to restore an original RLC SDU from the received RLC PDUs.

The PDCP layer is used only in a packet exchange area and a header of an IP packet may be compressed and transmitted so as to increase transmission efficiency of packet data in a radio channel.

The RRC layer as the third layer serves to control a lower layer and exchanges radio resource control information between the user equipment and a network. Various RRC statuses including an idle mode an RRC connected mode, and the like are defined according to a communication status of the user equipment and transition between the RRC statuses is possible as necessary. In the RRC layer, various procedures associated with radio resource management are defined, which include system information broadcasting, an RRC access management procedure, a multiple component carrier configuring procedure, a radio bearer controlling procedure, a security procedure, a measurement procedure, a mobility management procedure (handover), and the like.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of antennas and one receive antenna. The SISO system uses one antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

FIG. 1 illustrates a structure of a radio frame in 3GPP LTE.

This may refer to section 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame is constituted by 10 subframes and one subframe is constituted by 2 slots. Slots in the radio frame are numbered with slots numbers of #0 to #19. A time required to transmit one subframe is referred to as a transmission time interval (TTI). The TTI may be a scheduling unit for data transmission. For example, the length of one frame may be 10 ms, the length of one subframe may be 1 ms, and the length of one slot may be 0.5 ms.

One slot includes a plurality of orthogonal frequency division multiplexing (OFDM) symbols in a time domain and includes a plurality of subcarriers in a frequency domain. Since the 3GPP LTE uses the OFDMA in the downlink, the OFDM symbol is used to express one symbol period and may be called other name according to a multiple access scheme. For example, when SC-FDMA is used as an uplink multiple access scheme, the OFDM symbol may be called an SC-FDMA symbol. A resource block (RB) includes a plurality of contiguous subcarriers in one slot as a resource allocation unit. The structure of the radio frame is just one example. Accordingly, the number of subframes included in the radio frame, the number of slots included in the subframe, or the number of OFDM symbols included in the slot may be variously changed.

The 3GPP LTE defines that one slot includes 7 OFDM symbols in a normal cyclic prefix (CP) and one slot includes 6 OFDM symbols in an extended CP.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be acquired from the uplink channel response. In the TDD scheme, since an entire frequency band is time-divided into the uplink transmission and the downlink transmission, the downlink transmission by the base station and the uplink transmission by the terminal may not simultaneously be performed. In the TDD system in which the uplink transmission and the downlink transmission are divided by the unit of the subframe, the uplink transmission and the downlink transmission are performed in different subframes.

Figure 2:
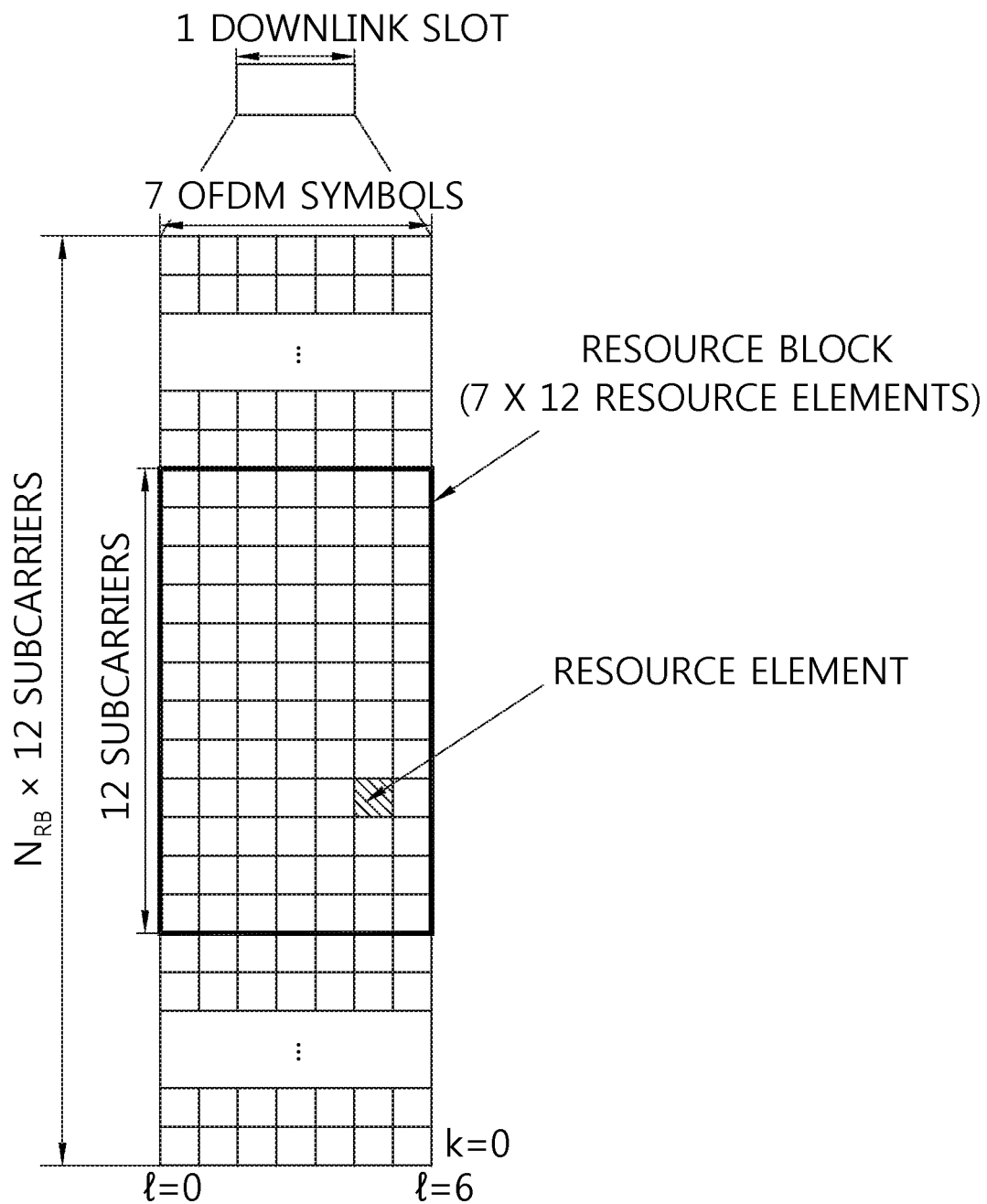
FIG. 2 illustrates one example of a resource grid for one downlink slot.

FIG. 2 illustrates one example of a resource grid for one downlink slot.

The downlink slot includes a plurality of OFDM symbols in the time domain and includes $N_{RB}$ resource blocks in the frequency domain. The number $N_{RB}$ of resource blocks included in the downlink slot is subordinate to a downlink bandwidth $N^{DL}$ set in a cell. For example, in an LTE system, $N_{RB}$ may be any one of 6 to 110. One resource block includes a plurality of subcarriers in the frequency domain. A structure of an uplink slot may also be the same as that of the downlink slot.

Each element on the resource grid is called a resource element (RE). The resource element on the resource grid may be identified by a pair of indexes (k,l) in the slot. Herein, k ($k=N_{RB} \times 12-1$) represents a subcarrier index in the frequency domain and l (l=0, . . . , 6) represents an OFDM symbol index in the time domain.

Herein, it is exemplarily described that one resource block is constituted by 7 OFDM symbols in the time domain and 12 subcarriers in the frequency domain and thus includes 7×12 resource elements, but the number of the OFDM symbols and the number of the subcarriers in the resource block are not limited thereto. The number of the OFDM symbols and the number of the subcarriers may be variously changed depending on the length of a CP, frequency spacing, and the like. For example, in the case of a normal CP, the number of OFDM symbols is 7 and in the case of an extended CP, the number of OFDM symbols is 6. As the number of subcarriers in one OFDM symbol, one may be selected and used among 128, 256, 512, 1024, 1536, and 2048.

Figure 3:
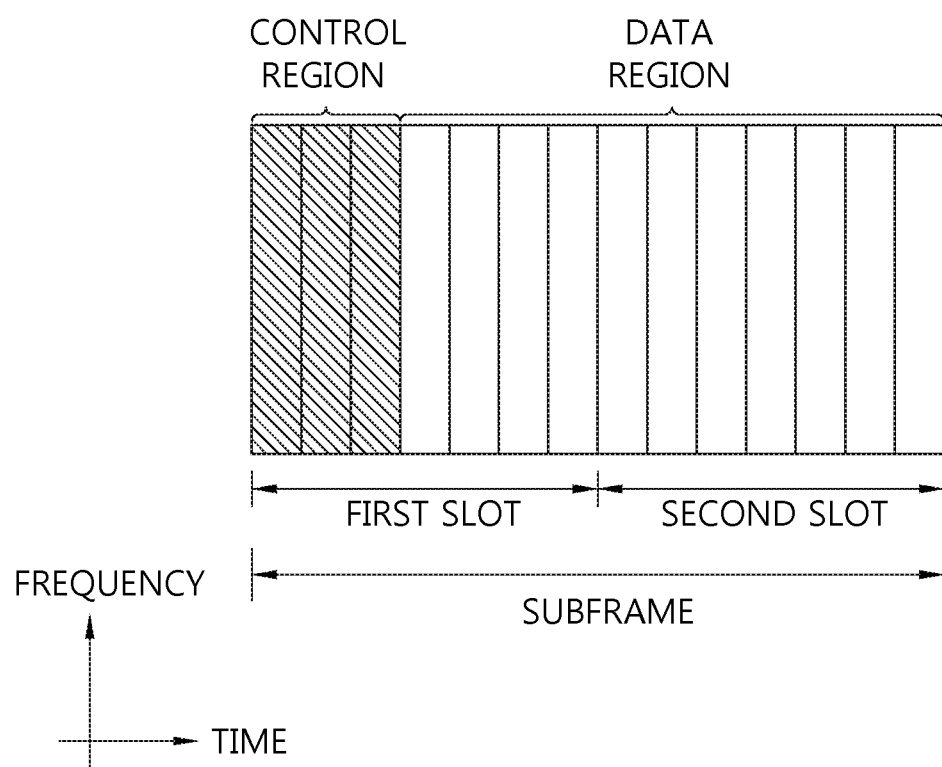
FIG. 3 illustrates a structure of a downlink subframe.

FIG. 3 illustrates a structure of a downlink subframe.

The downlink subframe includes two slots in the time domain and each slot includes seven OFDM symbols in the normal CP. Preceding maximum 3 OFDM symbols (maximum 4 OFDM symbols for a 1.4 Mhz bandwidth) of a first slot in the subframe are a control region to which control channels are allocated and residual OFDM symbols become a data region to which a physical downlink shared channel (PDSCH) is allocated.

A PUCCH may transport resource allocation and a transmission format of a downlink-shared channel, resource allocation information of an uplink shared channel, paging information on a PCH, system information on the DL-SCH, resource allocation of a higher layer control message such as a random access response transmitted on the PDSCH, a set of transmission power control commands for individual UEs in a predetermined UE group, and activation of voice over Internet protocol (VoIP). A plurality of PDCCHs may be transmitted in the control region and the terminal may monitor the plurality of PDCCHs. The PDCCH is transmitted on aggregation of one or several contiguous control channel elements (CCEs). The CCE is a logical allocation unit used to provide to the PDCCH coding rate depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines the PDCCH format according to the downlink control information (DCI) to be sent to the terminal and affixes a cyclic redundancy check (CRC) to the control information. A unique identifier (radio network temporary identifier (RNTI)) is masked on the CRC according to an owner or a purpose of the PDCCH. In the case of a PDCCH for a specific terminal, a unique identifier of the terminal, for example, a cell (C)-RNTI may be masked on the CRC. Alternatively, in the case of a PDCCH for a paging message, a paging indication identifier, for example, a paging (P)-RNTI may be masked on the CRC. In the case of a PDCCH for a system information block (SIB), a system information (SI)-RNTI may be masked on the CRC. A random access (RA)-RNTI may be masked on the CRC in order to indicate the random access response which is a response to transmission of a random access preamble of the terminal.

Figure 4:
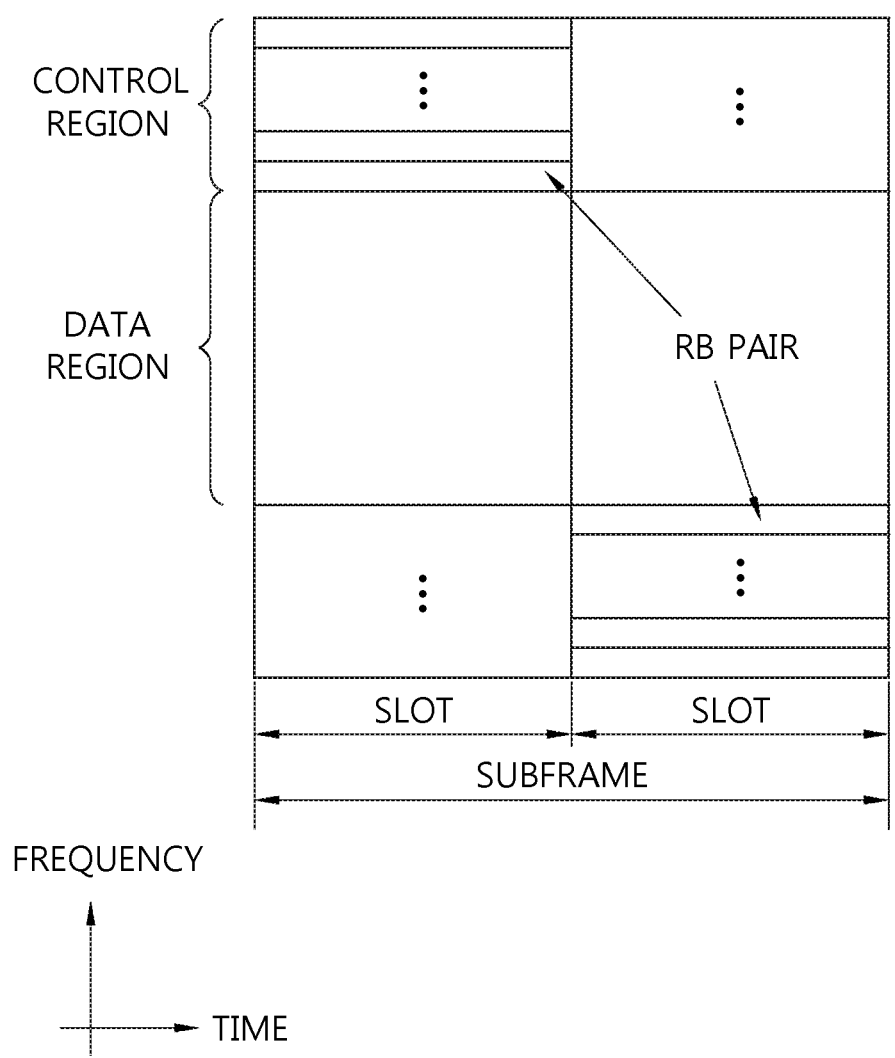
FIG. 4 illustrates a structure of an uplink subframe.

FIG. 4 illustrates a structure of an uplink subframe.

The uplink subframe may be divided into a control region and a data region in the frequency domain. The physical uplink control channel (PUCCH) for transmitting the uplink control information is allocated to the control region. The physical uplink shared channel (PUSCH) for transmitting data is allocated to the data region.

When indicated in a higher layer, the terminal may support simultaneous transmission of the PUSCH and the PUCCH.

A PUCCH for one terminal is allocated to a resource block pair in the subframe. Resource blocks that belong to the resource block pair occupy different subcarriers in first and second slots, respectively. A frequency occupied by the resource block that belongs to the resource block pair allocated to the PUCCH is changed based on a slot boundary. This means that the RB pair allocated to the PUCCH is frequency-hopped on the slot boundary. The terminal transmits the uplink control information through different subcarriers with time to acquire a frequency diversity gain.

The PUSCH is mapped to the uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the uplink control information (UCI). For example, the uplink control information multiplexed to data may include a channel quality indicator (CQI), a precoding matrix indicator (PMI), hybrid automatic repeat request acknowledgement/not-acknowledgement (HARQ-ACK/NACK) (may be represented as HARQ-ACK or simply represented by A/N), a rank indicator (RI), and the like. Alternatively, the uplink data may be constituted by only the uplink control information.

Meanwhile, the wireless communication system may support carrier aggregation (CA). Herein, the carrier aggregation means collecting a plurality of carriers having a small bandwidth to configure a wide band. The carrier aggregation system means a system that configures the wide band by collecting one or more subcarriers having a smaller bandwidth than a target wide band when the wireless communication system supports the wide band.

Figure 5:
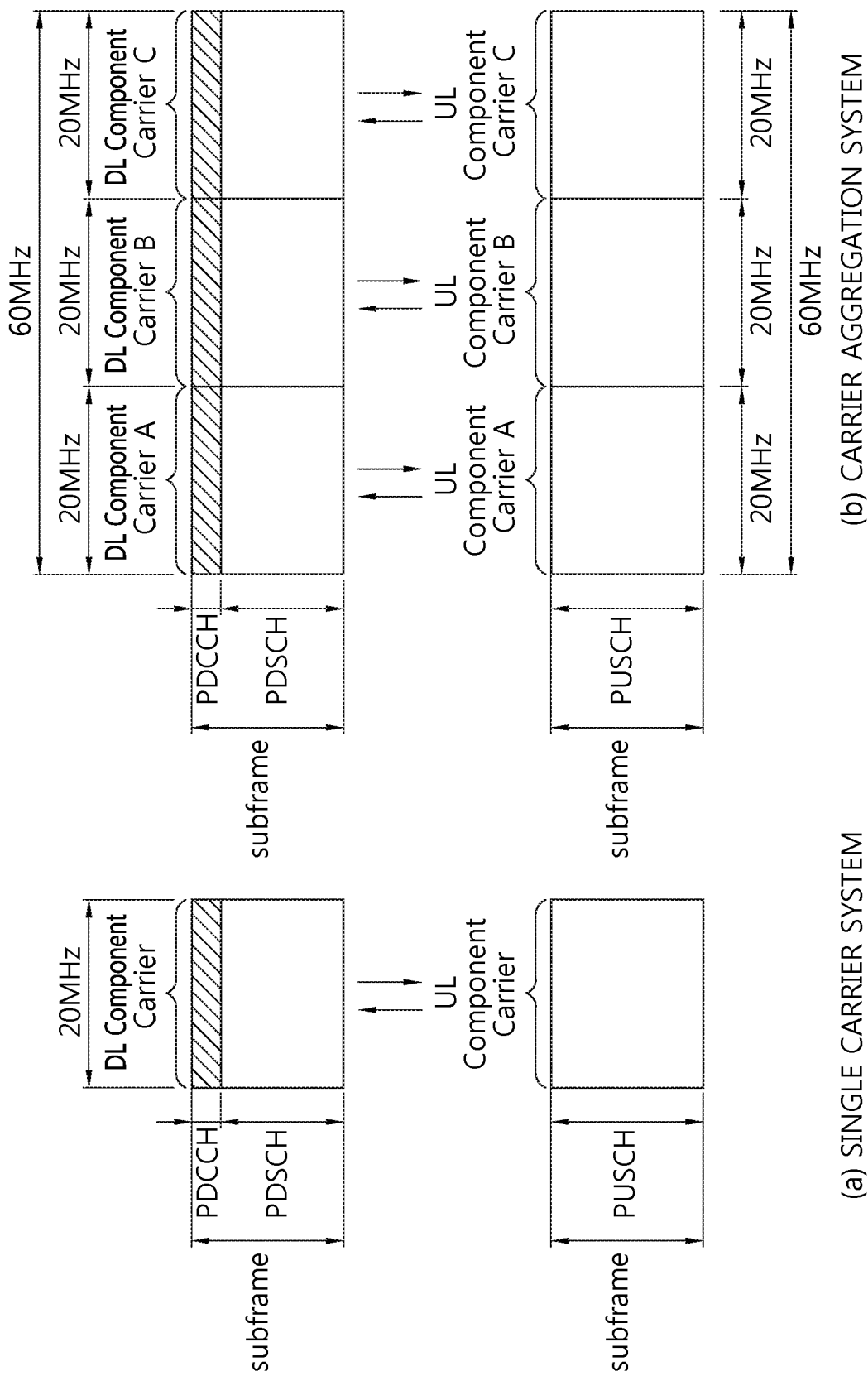
FIG. 5 illustrates a comparative example of a single carrier system and a carrier aggregation system.

FIG. 5 illustrates a comparative example of a single carrier system and a carrier aggregation system.

Referring to FIG. 5, in the single carrier system, only one carrier may be supported to the terminal through the uplink and the downlink. A bandwidth of the carrier may be diversified, but one carrier is allocated to the terminal. On the contrary, in the carrier aggregation system, a plurality of component carriers (CCs) may be allocated to the terminal. For example, three 20 MHz component carriers may be allocated to allocate a bandwidth of 60 MHz to the terminal. The component carrier includes a downlink component carrier (DL CC) and an uplink (UL) CC.

The carrier aggregation system may be divided into a contiguous carrier aggregation system in which respective carriers are contiguous and a non-contiguous carrier aggregation system in which the respective carriers are separated from each other. When hereinafter, the carrier aggregation system is simply referred to as the carrier aggregation system, it should be understood that the carrier aggregation system includes both the contiguous carrier aggregation system in which the respective component carriers are contiguous and the non-contiguous carrier aggregation system in which the respective component carriers are not contiguous.

Component carriers as targets when one or more component carriers are collected may just use a bandwidth used in the existing system for backward compatibility with the existing system. For example, a 3GPP LTE system supports bandwidths of 1.4 MHz, 3 MHz, 5 MHz, 10 MHz, 15 MHz, and 20 MHz and a 3GPP LTE-A system may configure a wide band of 20 MHz or more by using only the bandwidths of the 3GPP LTE system. Alternatively, the wideband may be configured by defining a new bandwidth without using the bandwidth of the existing system as it is.

A system frequency band of the wireless communication system is divided into a plurality of carrier frequencies. Herein, the carrier frequency means a center frequency of a cell. Hereinafter, the cell may mean a downlink frequency resource and an uplink frequency resource. Alternatively, the cell may mean a combination the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the terminal should first complete a configuration for the specific cell. Herein, the configuration means a state in which receiving system information required to transmit and receive data to the corresponding cell is completed. For example, the configuration may include a whole process of receiving common physical layer parameters required to transmit and receive data, MAC layer parameters, or parameters required for a specific operation in an RRC layer. When a cell of which a configuration is completed receives only information to transmit the packet data, the cell is in a state in which a packet can be immediately transmitted and received.

The cell of which the configuration is completed may exist in an activation state or a deactivation state. Herein, the activation represents that data is transmitted or received or the cell is in a ready state. The terminal may monitor or receive the control channel (PDCCH) and the data channel (PDSCH) of the activated cell in order to verify resources (may be the frequency, the time, and the like) allocated thereto.

The deactivation represents that it is impossible to transmit or receive traffic data or measurement or minimum information can be transmitted/received. The terminal may receive system information (SI) required to receive the packet from the deactivated cell. On the contrary, the terminal does not monitor or receive the control channel (PDCCH) and the data channel (PDSCH) of the deactivated cell in order to verify the resources (may be the frequency, the time, and the like) allocated thereto.

The cell may be divided into a primary cell (PCell), a secondary cell (SCell), and a serving cell.

The primary cell means a cell that operates at a primary frequency and means a cell in which the terminal performs an initial connection establishment procedure or a connection reestablishment procedure with the base station or a cell indicated the primary cell during a handover procedure.

The secondary cell means a cell that operates at a secondary frequency and once RRC establishment is settled, the secondary cell is configured and is used to provide an additional radio resource.

The serving cell is configured as the primary cell when the terminal is a terminal in which the CA is not configured or the CA cannot be provided. When the CA is configured, a term called the serving cell is used to represent a set constituted by the primary cell and one or a plurality of cells of all secondary cells.

That is, the primary cell represents one serving cell that provides a security input and NAS mobility information in an RRC establishment or re-establishment state. According to capabilities of the user equipment, at least one cell may be configured to form a set of serving cells together with the primary cell and the at least one cell is referred to as the second cell.

Accordingly, the serving cell configured for one terminal may be constituted by only one primary cell or may be constituted by one primary cell and at least one secondary cell and a plurality of serving cells may be configured for the terminal.

A primary component carrier (PCC) means a CC corresponding to the primary cell. The PCC is a CC in which the terminal is initially connected or RRC-connected with the base station among several CCs. The PCC is a special CC that takes charge of connection or RRC connection for signaling regarding a plurality of CCs and manages UE context information which is establishment information associated with the terminal. Further, the PCC is connected with the terminal and the PCC is in an RRC connected mode, the PCC continuously exists in the activation state.

A second component carrier (SCC) means a CC corresponding to the second cell. That is, the SCC is a CC allocated to the terminal except for the PCC and the SCC is an extended carrier for additional resource allocation, or the like and the SCC may be in the activated state or the deactivated state.

A downlink component carrier corresponding to the primary cell is referred to as a downlink primary component carrier (DL PCC) and an uplink component carrier corresponding to the primary cell is referred to as an uplink primary component carrier (UL PCC). Further, in the downlink, a component carrier corresponding to the secondary cell is referred to as a downlink secondary component carrier (DL SCC) and in the uplink, a component carrier corresponding to the secondary cell is referred to as an uplink secondary component carrier (UL SCC).

The primary cell and the secondary cell have the following features.

First, the primary cell is used for transmission of the PUCCH.

Second, the primary cell is continuously activated, while the secondary cell is a carrier activated/deactivated according to a specific condition.

Third, when the primary cell undergoes a radio link failure (hereinafter, referred to as RLF), the RRC re-establishment is triggered, but when the secondary cell undergoes the RLF, the RRC re-establishment is not triggered.

Fourth, the primary cell may be changed by changing a security key or a handover procedure accompanied with a random access channel (RACH).

Fifth, non-access stratum (NAS) information is received through the primary cell.

Sixth, in the primary cell, the DL PCC and the UL PCC are continuously constituted as a pair.

Seventh, different component carriers CCs may be configured as the primary cell in respective terminals.

Eighth, procedures of reconfiguration, adding, and removal of the primary cell may be performed by the RRC layer. In adding a new secondary cell, RRC signaling may be used to transmit system information of a dedicated secondary cell.

The downlink component carrier may constitute one serving cell, and the downlink component carrier and the uplink component carrier are established to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CC1, activation of serving cell 1 means activation of DL CC1. Assumed that serving cell 2 is constituted by establishing DL CC2 and UL CC2, activation of serving cell 2 means activation of DL CC2 and UL CC2. In the meantime, each component carrier may correspond to the cell.

The numbers of component carriers aggregated between the downlink and the uplink may be set to be different from each other. A case in which the number of the downlink component carriers and the number of uplink component carriers are the same as each other is referred to as symmetric aggregation and a case in which the numbers are different from each other is referred to as asymmetric aggregation. Further, the sizes (that is, bandwidths) of the component carriers may be different from each other. For example, when it is assumed that five component carriers are used to configure a 70 MHz-band, the 70 MHz-band may be constituted by 5 MHz component carrier (carrier #0), 20 MHz component carrier (carrier #1), 20 MHz component carrier (carrier #2), 20 MHz component carrier (carrier #3), and 5 MHz component carrier (carrier #4).

As described above, the carrier aggregation system may support a plurality of component carriers (CCs) unlike the single carrier system. That is, one terminal may receive a plurality of PDSCHs through a plurality of DL CCs. Further, the terminal may transmit an ACK/NACK for the plurality of PDSCH through one UL CC, for example, UL PCC. That is, in the single carrier system in the related art, since only one PDSCH is received in one subframe, maximum two pieces of HARQ ACK/NACK (hereinafter, abbreviated as ACK/NACK for easy description) were just transmitted. However, in the carrier aggregation system, since the ACK/NACK for the plurality of PDSCHs may be transmitted through one UL CC, an ACK/NACK transmitting method therefor is required.

The terminal may monitor the PDCCH in the plurality of DL CCs and receive a downlink transport block simultaneously through the plurality of DL CCs. The user equipment may transmit a plurality of uplink transport blocks simultaneously through a plurality of UL CCs.

In the multiple carrier system, two methods for CC scheduling can be provided.

The first method is that a PDCCH-PDSCH pair is transmitted in one CC. The CC is referred to as self-scheduling. Further, this means that the UL CC through which the PUSCH is transmitted means becomes a CC linked to the DL CC through which the corresponding PDSCCH is transmitted. That is, in the PDCCH, the PDSCH resource is allocated on the same CC or the PUSCH resource is allocated on the linked UL CC.

The second method is that the DL CC through which the PDSCH is transmitted or the UL CC through which the PUSCH is transmitted is determined regardless of the DL CC through which the PDCCH is transmitted. That is, the PDCCH and the PDSCH are transmitted in different DL CCs or the PUSCH is transmitted through the UL CC not linked with the DL CC through which the PDCCH is transmitted. This is referred to as cross-carrier scheduling. The CC through which the PDCCH is transmitted is referred to as a PDCCH carrier, a monitoring carrier, or a scheduling carrier or the CC through which the PDSCH/PUSCH is transmitted is referred to as a PDSCH/PUSCH carrier or a scheduled carrier.

Hereinafter, the existing PUCCH formats will be described.

The PUCCH transports various types of control information according to a format. PUCCH format 1 transports a scheduling request (SR). In this case, an on-off keying (OOK) scheme may be applied. PUCCH format 1a transports an acknowledgement/non-acknowledgment (ACK/NACK) modulated by a binary phase shift keying (BPSK) scheme one codeword. PUCCH format 1b transports an ACK/NACK modulated by a quadrature phase shift keying (QPSK) scheme for two codewords. PUCCH format 2 transports a channel quality indicator (CQI) modulated by the QPSK scheme. PUCCH formats 2a and 2b transport the CQI and the ACK/NACK.

Table 1 illustrates a modulation scheme according to the PUCCH format and the number of bits in the subframe.

TABLE 1

| PUCCH format | Modulation scheme | Number of bits per subframe, $M_{bit}$ |
| --- | --- | --- |
| 1 | N/A | N/A |
| 1a | RPSK | 1 |
| 1b | QPSK | 2 |
| 2 | QPSK | 20 |
| 2a | QPSK + BPSK | 21 |
| 2b | QPSK + QPSK | 22 |

Figure 6:
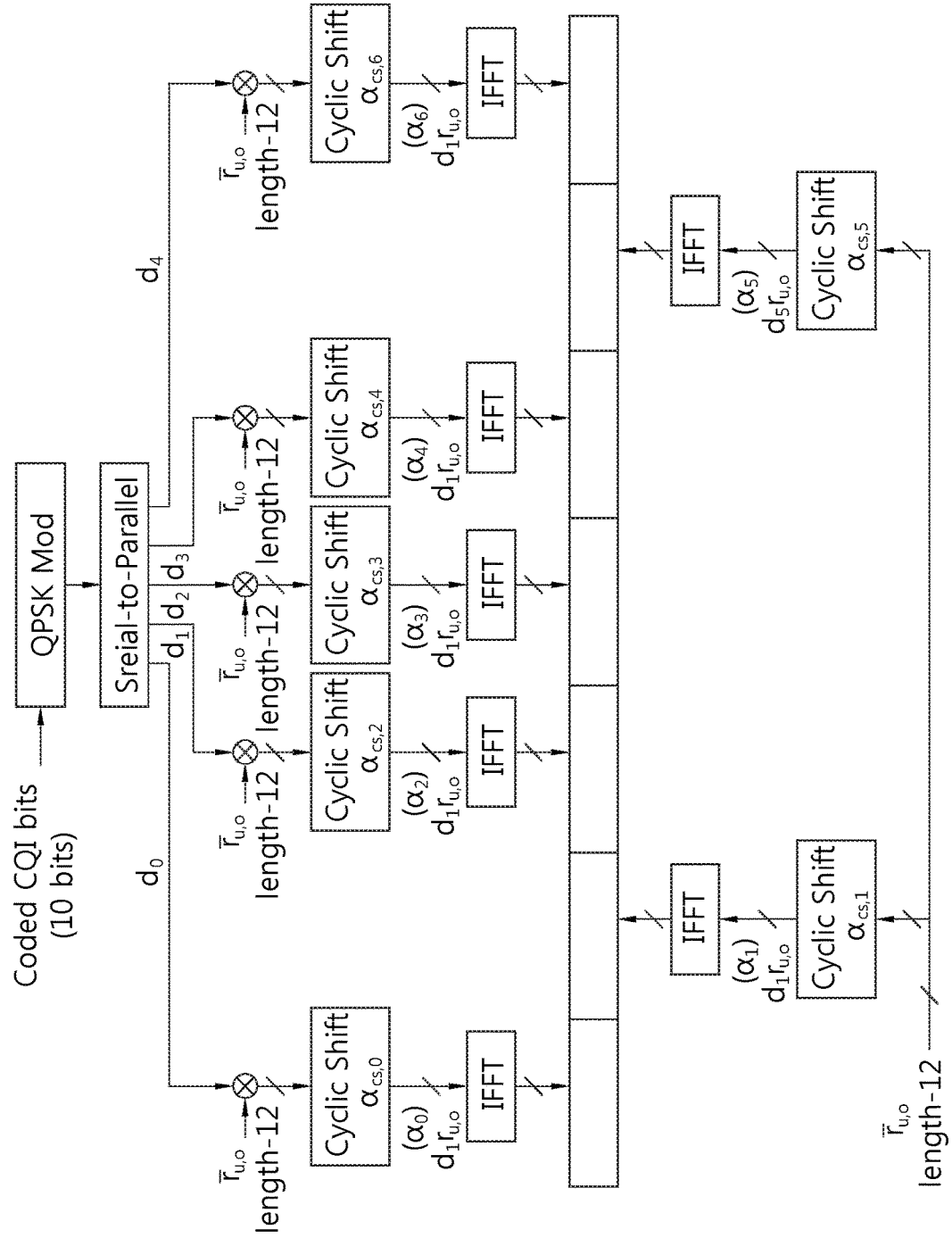
FIG. 6 illustrates a channel structure of a PUCCH format 2/2a/2b for one slot in a normal CP.

FIG. 6 illustrates a channel structure of a PUCCH format 2/2a/2b for one slot in a normal CP. As described above, the PUCCH format 2/2a/2b is used to transmit the CQI.

Referring to FIG. 6, SC-FDMA symbols 1 and 5 are used for a demodulation reference symbol (DM RS) which is an uplink reference signal in the normal CP. In the extended CP, SC-FDMA symbol 3 is used for the DM RS.

10 CQI information bits are channel-coded at for example, ½ rate to become 20 coded bits. A Reed-Muller (RM) code may be used in the channel coding. In addition, the information bits are scrambled (similarly as PUSCH data being scrambled with a gold sequence having a length of 31) and thereafter, QPSK constellation mapped, and as a result, a QPSK modulation symbol is generated ($d_0$ to $d_4$ in slot 0). Each QPSK modulation symbol is modulated by a cyclic shift of a basic RS sequence having a length of 12 and OFDM-modulated and thereafter, transmitted in each of 10 SC-FDMA symbols in the subframe. 12 uniformly separated periodic shifts allow 12 different user equipments to be orthogonally multiplexed in the same PUCCH resource block. As a DM RS sequence applied to the SC-FDMA symbols 1 and 5, the basic RS sequence having the length of 12 may be used.

Figure 7:
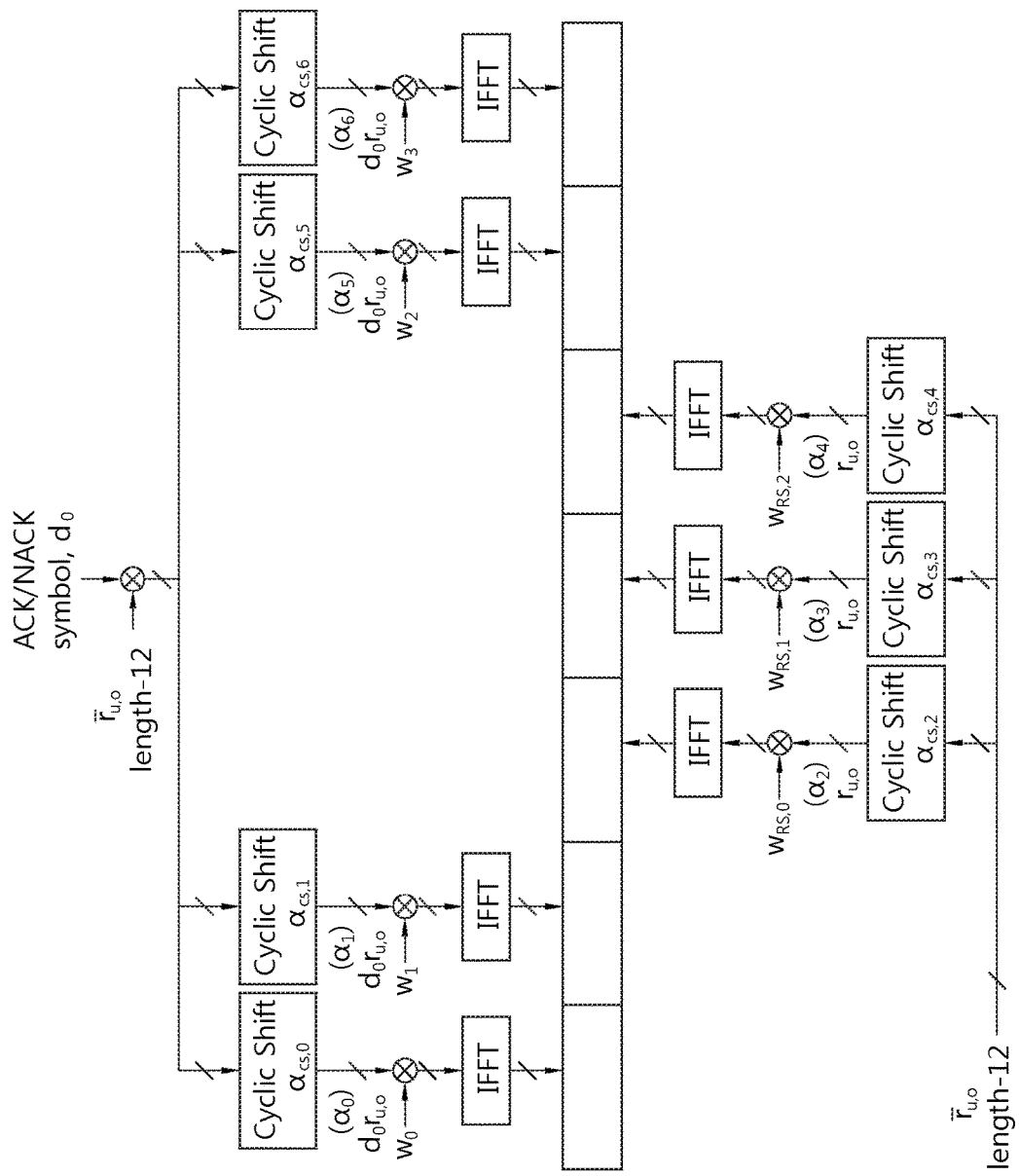
FIG. 7 illustrates a PUCCH format 1a/1b for one slot in the normal CP.

FIG. 7 illustrates a PUCCH format 1a/1b for one slot in the normal CP. The uplink reference signal is transmitted in $3^{rd}$ to $5^{th}$ SC-FDMA symbols. In FIG. 7, $w_0$, $w_1$, $w_2$, and $w_3$ may be modulated in the time domain after inverse fast Fourier transform (IFFT) modulation or in the frequency domain before the IFFT modulation.

In the LTE, the ACK/NACK and the CQI may be simultaneously in the same subframe and may not be permitted to be simultaneously transmitted. When the ACK/NACK and the CQI are not permitted to be simultaneously transmitted, the user equipment may need to transmit the ACK/NACK in a PUCCH of a subframe in which CQI feedback is configured. In this case, the CQI is dropped and only the ACK/NACK is transmitted through the PUCCH format 1a/1b.

The simultaneous transmission of the ACK/NACK and the CQI in the same subframe may be configured through user equipment-specific higher layer (RRC) signaling. For example, whether the ACK/NACK and the CQI may be simultaneously transmitted in the same subframe may be configured by a parameter 'simultaneousAckNackAndCQI' included in the radio resource control (RRC) message. That is, when 'simultaneousAckNackAndCQI' is set 'TRUE', the simultaneous transmission may be permitted when 'simultaneousAckNackAndCQI' is set as 'FALSE', the simultaneous transmission may not be permitted. When the simultaneous transmission is available, the CQI and 1-bit or 2-bit ACK/NACK information may be multiplexed to the same PUCCH resource block in a subframe in which a base station scheduler permits the simultaneous transmission of the CQI and the ACK/NACK. In this case, it is necessary to maintain a single carrier characteristic having low cubic metric (CM). The normal CP and the extended CP are different from each other in a method for multiplexing the CQI and the ACK/NACK while maintaining the single carrier characteristic.

First, when the 1-bit or 2-bit ACK/NACK and the CQI are together transmitted through the PUCCH format 2a/2b in the normal CP, ACK/NACK bits are not scrambled, but BPSK (in the case of 1 bit)/QPSK (in the case of 2 bits)-modulated to become one ACK/NACK demodulated symbol ($d_{HARQ}$). The ACK is encoded by a binary '1' and the NACK is encoded by a binary '0'. One ACK/NACK demodulated symbol ($d_{HARQ}$) is used to modulate a second RS symbol in each slot. That is, the ACK/NACK is signaled by using the RS.

Figure 8:
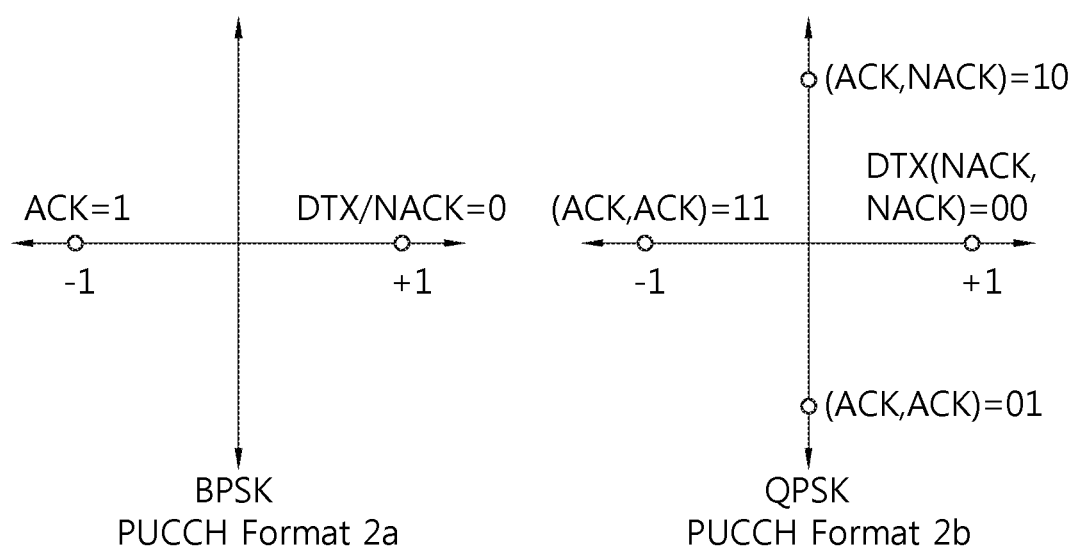
FIG. 8 illustrates an example of constellation mapping of ACK/NACK in the PUCCH format 2a/2ba in the normal CP.

FIG. 8 illustrates an example of constellation mapping of ACK/NACK in the PUCCH format 2a/2ba in the normal CP.

Referring to FIG. 8, the NACK (NACK and NACK in the case of transmitting two downlink codewords) is mapped to +1. In discontinuous transmission (DTX) meaning a case in which the user equipment fails to detect a downlink grant in the PDCCH, neither the ACK nor the NACK is transmitted and in this case, a default NACK is configured. The DTX is analyzed as the NACK and causes downlink retransmission.

Next, in the extended CP in which one RS symbol per slot is used, the 1 or 2-bit ACK/NACK is joint-coded with the CQI.

Figure 9:
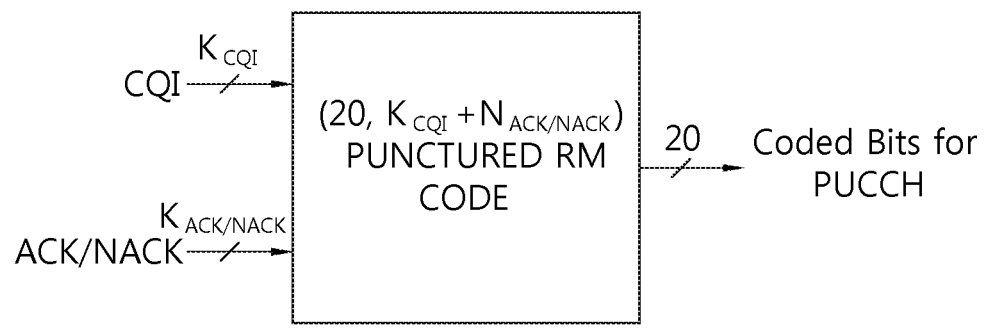
FIG. 9 illustrates an example of joint coding of ACK/NACK and a CQI in an extended CP.

FIG. 9 illustrates an example of joint coding of ACK/NACK and a CQI in an extended CP.

Referring to FIG. 9, the maximum bit number of information bits supported by an RM code may be 13. In this case, CQI information bits $K_{cqi}$ may be 11 bits and ACK/NACK information bits $K_{ACK/NACK}$ may be 2 bits. The CQI information bits and the ACK/NACK information bits are concatenated to generate a bit stream and thereafter, channel-coded by the RM code. In this case, it is expressed that the CQI information bits and the ACK/NACK information bits are joint-coded. That is, the CQI information bits and the ACK/NACK information bits are joint-coded to become 20 coded bits. A 20-bit codeword generated through such a process is transmitted in the PUCCH format 2 having the channel structure (different from FIG. 6 in that one RS symbol is used per slot in the case of the extended CP) described in FIG. 6.

In the LTE, the ACK/NACK and the SR are multiplexed to be simultaneously transmitted through the PUCCH format 1a/1b.

Figure 10:
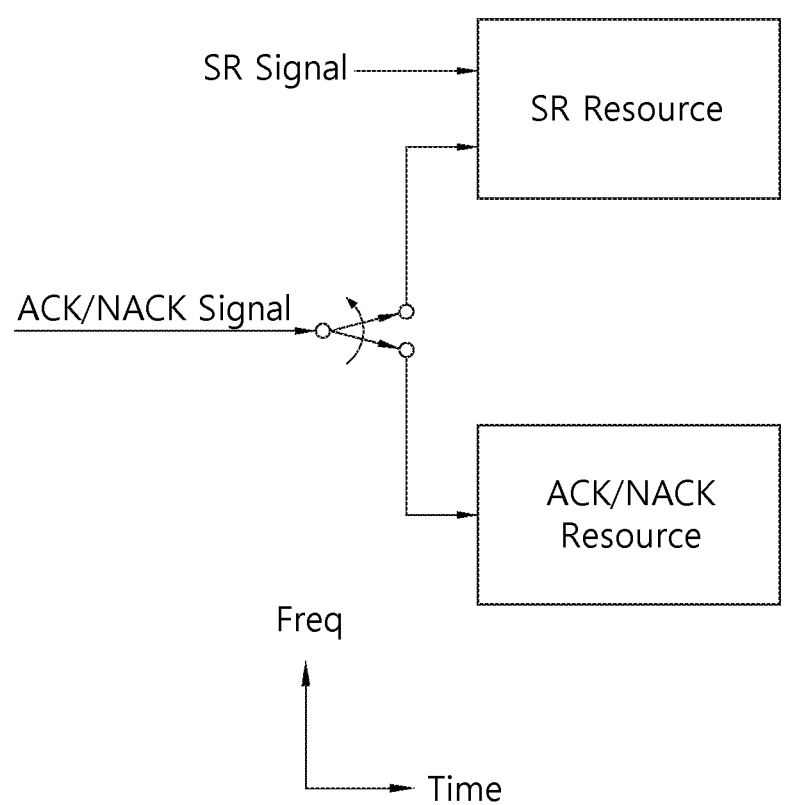
FIG. 10 illustrates a method in which ACK/NACK and an SR are multiplexed.

FIG. 10 illustrates a method in which ACK/NACK and an SR are multiplexed.

Referring to FIG. 10, when the ACK/NACK and the SR are simultaneously transmitted in the same subframe, the user equipment transmits the ACK/NACK in an allocated SR resource and in this case, the ACK/NACK means a positive SR. When receiving the positive SR, the base station may know that the user equipment requests scheduling. Further, the user equipment may transmit the ACK/NACK in an allocated ACK/NACK resource and the ACK/NACK means a negative SR. That is, the base station may identify whether the SR is the positive SR or the negative SR as well as the ACK/NACK through which resource the ACK/NACK being transmitted in the subframe in which the ACK/NACK and the SR are simultaneously transmitted.

Figure 11:
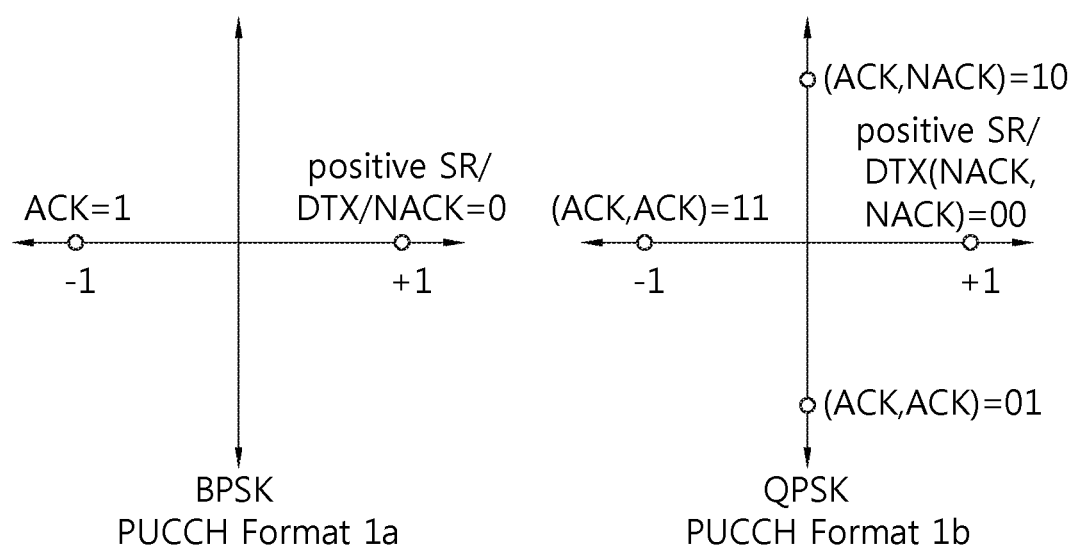
FIG. 11 illustrates constellation mapping when the ACK/NACK and the SR are simultaneously transmitted.

FIG. 11 illustrates constellation mapping when the ACK/NACK and the SR are simultaneously transmitted.

Referring to FIG. 11, the DTX/NACK and the positive SR are mapped to +1 of a constellation map and the ACK is mapped to −1. The constellation map may show a phase of a signal.

Meanwhile, in the LTE TDD system, the user equipment may feed back to the base station a plurality of ACKs/NACKs for a plurality of PDSCHs. The reason is that the user equipment may receive the plurality of PDSCHs in a plurality of subframes and transmit the ACKs/NACKs for the plurality of PDSCH in one subframe. In this case, two types of ACK/NACK transmitting methods are provided.

The first method is ACK/NACK bundling. In the ACK/NACK bundling, ACK/NACK bits for a plurality of data units are coupled through a logical AND operation. For example, when the user equipment successfully decodes all of the plurality of data units, the user equipment transmits only one ACK bit. On the contrary, when the user equipment fails to decode or detect even any one of the plurality of data units, the user equipment transmits the NACK bit or transmit no NACK bit.

Bundling includes spatial bundling, bundling in the time domain, and bundling in the frequency domain, and the like. The spatial bundling is a technique that compresses an A/N for each codeword at the time of receiving a plurality of codewords in one PDSCH. The bundling in the time domain is a technique that compresses A/N for data units received in different subframes. The bundling in the frequency domain is a technique that compresses A/N for data units received in different cells (that is, CCs).

The second method is ACK/NACK multiplexing. In the ACK/NACK multiplexing method, contents or meanings of the ACKs/NACKs for the plurality of data units may be identified by combinations of PUCCH resources and QPSK modulated symbols used for actual ACK/NACK transmission. This is also called channel selection. The channel selection may be called PUCCH 1a/1b channel selection according to the used PUCCH.

For example, it is assumed that maximum two data unit may be transmitted and one PUCCH resource may transmit 2 bits. In this case, it is assumed that an HARQ operation for each data unit may be managed by one ACK/NACK bit. In this case, the ACK/NACK may be identified in a transmission node (for example, the base station) that transmits the data unit as shown in a table given below.

TABLE 2

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 2, HARQ-ACK(i) indicates an ACK/NACK result data unit i. In the example, two data units of data unit 0 and data unit 1 may be provided. In Table 2, the DTX means that the data unit for the corresponding HARQ-ACK (i) is not transmitted. Alternatively, the DTX means that the receiver (for example, the user equipment) is not capable of detecting the data unit for the HARQ-ACK(i). $n^{(1)}_{PUCCH,x}$ indicates the PUCCH resource used for the actual transmission of the ACK/NACK and maximum two PUCCH resources are provided. That is, two PUCCH resources are $n^{(1)}_{PUCCH,0}$ and $n^{(1)}_{PUCCH,1}$. b(0) and b(1) represent 2 bits transferred by a selected PUCCH resource. A modulated symbol transmitted through the PUCCH resource is determined according to b(0) and b(1).

For example, if the receiver successfully receives and decodes two data units, the receiver needs to transmit two bits (b(0), b(1)) as (1,1) by using the PUCCH resource $n^{(1)}_{PUCCH,1}$. As another example, it is assumed that the receiver receives two data units to fail to decode a first data unit and succeed in decoding a second data unit. In this case, the receiver needs to transmit (0, 0) by using $n^{(1)}_{PUCCH,1}$.

As described above, the ACKs/NACKs for the plurality of data units may be transmitted by using a single PUCCH resource by a method for linking the content (or meaning) of the ACK/NACK with a combination of a PUCCH resource and a content of an actual bit transmitted in the corresponding PUCCH resource.

In the ACK/NACK multiplexing method, if at least one ACK exists for all data units, the NACK and the DTX is displayed as a couple such as the NACK/DTX. The reason is that it is short to cover all ACK/NACK combinations by distinguishing the NACK and the DTX by only a combination of the PUCCH resource and the QPSK symbol.

In the ACK/NACK bundling or ACK/NACK multiplexing method, the total number of PDSCHs as targets transmitted by the user equipment is important. When the user equipment is not capable of receiving some PDCCHs among a plurality of PDCCHs to schedule a plurality of PDSCHs, an error occurs in the total number of the PDSCHs as the targets of the ACK/NACK, and as a result, a wrong ACK/NACK may be transmitted. In order to solve the error, a downlink assignment index (DAI) is transmitted with being included in the PDCCH in the TDD system. The DAI indicates a counting value by counting the number of the PDCCHs to schedule the PDSCH.

Hereinafter, an uplink channel coding method for the PUCCH format 2 will be described.

Table 3 given below shows one example of a (20, A) RM code used for channel coding of the PUCCH format 2. Herein, A may represent the bit number (that is, $K_{cqi}$+ $K_{ACK/NACK}$) of the bit stream in which the CQI information bits and the ACK/NACK information bits are concatenated. When the bit stream is, the bit stream may be used as an input of a channel coding block using the (20, A) RM code.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

A bit stream channel-coded by the RM code, $b_0$, $b_1$, $b_2$, ..., $b_{B\_1}$ may be generated as shown in Equation 1 given below.

[Equation 1]

$$b_i = \sum_{n=0}^{A-1} (a_n \cdot M_{i,n}) \bmod 2$$

[Equation 1]

In Equation given above, i=0, 1, 2, . . . , B−1 and B=20.

Channel-coded bits are mapped to the code-time-frequency resource.

Figure 12:
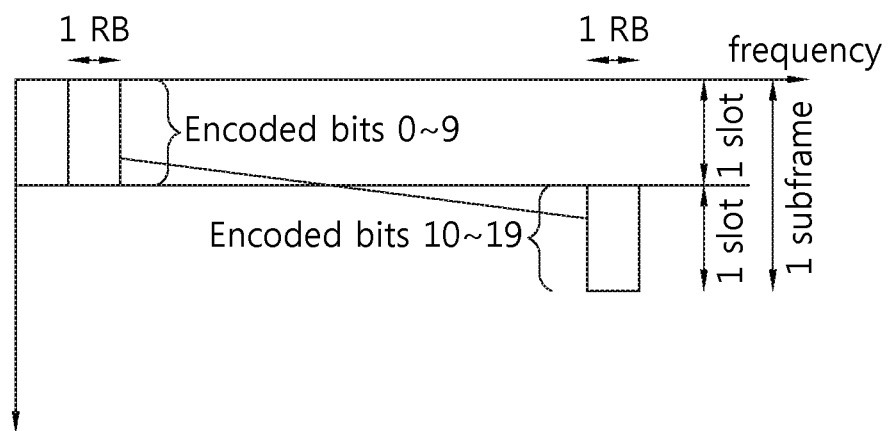
FIG. 12 illustrates an example in which channel-coded bits are mapped to a code-time-frequency resource.

FIG. 12 illustrates an example in which channel-coded bits are mapped to a code-time-frequency resource.

Referring to FIG. 12, first 10 bits and last 10 bits among 20 bits which are channel-coded are mapped to different code-time-frequency resources and in particular, first 10 bits and last 10 bits are largely separated and transmitted in in the frequency domain for frequency diversity.

Hereinafter, one example of an uplink channel coding method in LTE-A will be described.

As described above, in the LTE, when the UCI is transmitted in the PUCCH format 2, a CSI of maximum 13 bits is RM-coded through the (20, A) RM code of Table 3. On the contrary, when the UCI is transmitted through the PUSCH, a CQI of maximum 11 bits is RM-coded through a (32, A) RM code of Table 4 given below and truncated or circularly repeated in order to match code rate to be transmitted in the PUSCH.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 1 | 0 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |

TABLE 4-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Meanwhile, in the LTE-A, PUCCH format 3 is introduced in order to transmit a UCI (the ACK/NACK and the SR) of maximum 21 bits (represent the bit number before channel coding as information bits and maximum 22 bits when the SR is included).

The PUCCH format 3 performs block spreading based transmission. That is, a modulated symbol sequence that modulates a multi-bit ACK/NACK by using a block spreading code is spread and thereafter, transmitted in the time domain.

Figure 13:
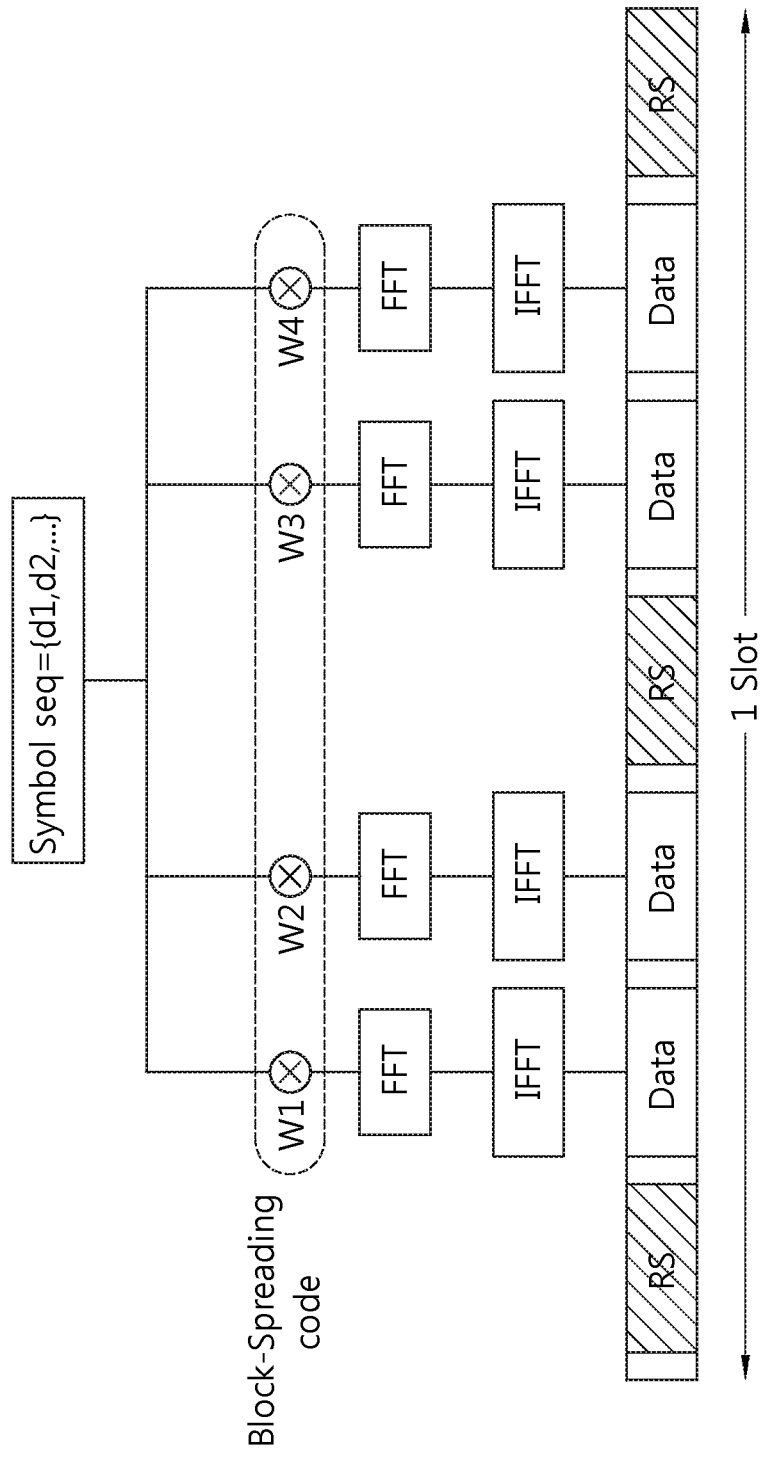
FIG. 13 exemplifies a channel structure of PUCCH format 3.

FIG. 13 exemplifies a channel structure of PUCCH format 3.

Referring to FIG. 13, the block spreading code is applied to a modulated symbol sequence {d1, d2, ... } to be spread in the time domain. The block spreading code may be an orthogonal cover code (OCC). Herein, the modulated symbol sequence may be a sequence of the modulated symbols in which the ACK/NACK information bits which are multiple bits are channel-coded (using the RM code, a TBCC, a punctured RM code, and the like) to generate ACK/NACK coded bits and the ACK/NACK coded bits are modulated (for example, QPSK-modulated). The sequence of the modulated symbols is mapped to data symbols of the slot through fast Fourier transform (FFT) and inverse fast Fourier transform (IFFT) and thereafter, transmitted. FIG. 13 exemplifies a case in which two RS symbols exist in one slot, but three RS symbols may exist and in this case, a block spreading code having a length of 4 may be used.

In the PUCCH format 3, 48 channel-coded bits may be transmitted in the normal CP. When UCI bits (information bits) are 11 bits or less, the (32, A) RM code of Table 4 is used and circular repetition is used to match the coded bit number of the PUCCH format 3. As shown in Table 4, since the (32, A) RM code just has 11 basis sequences, when the UCI bits are more than 11 bits, dual RM coding using two (32, A) RM codes is performed.

Figure 14:
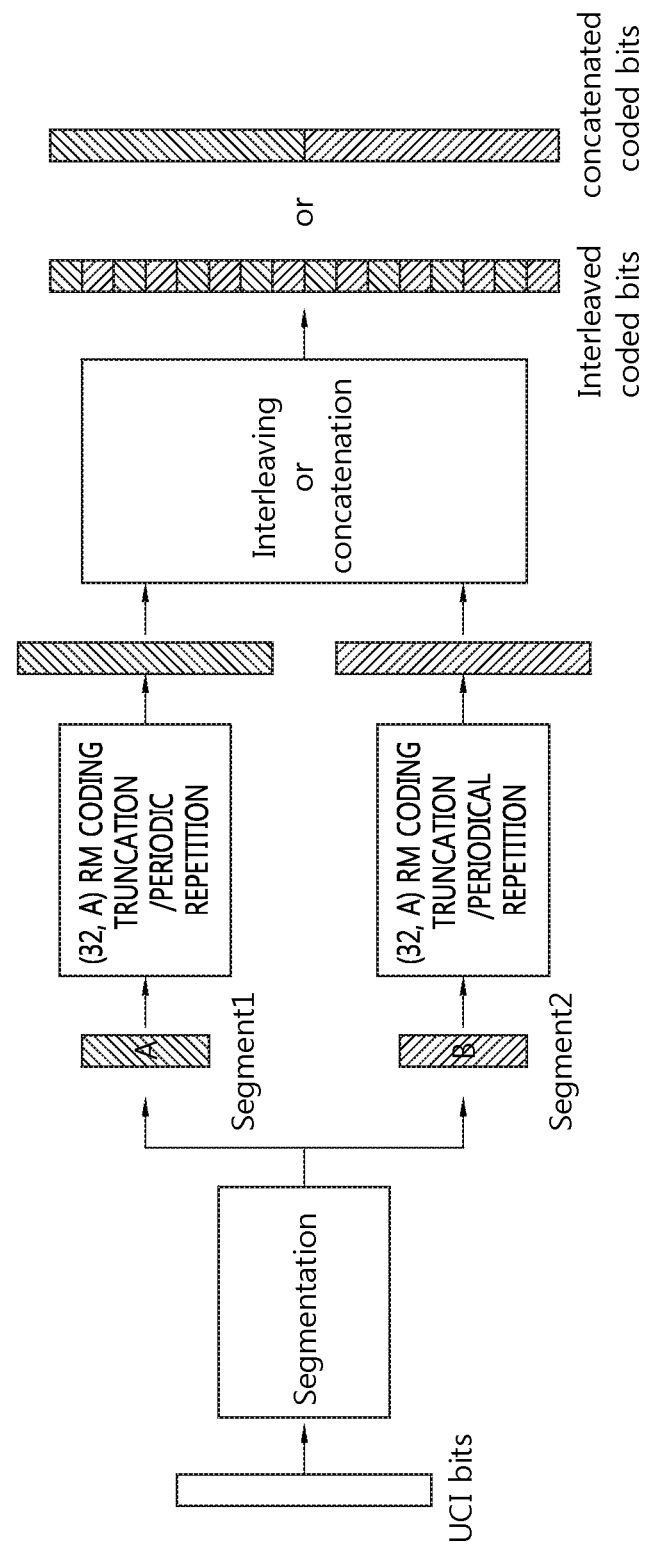
FIG. 14 exemplifies a dual RM coding process.

FIG. 14 exemplifies a dual RM coding process.

Referring to FIG. 14, when a UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM code. Thereafter, the UCI bit stream is truncated or circularly repeated in order to match the coded bit number of the PUCCH format 3.

[Method for Transmitting Channel State Information in Wireless Communication System]

A modulation and coding scheme (MCS) and transmission power are controlled according to a given channel by using link adaptation in order to maximally use a channel capacity given in the wireless communication system. In order to the base station to perform the link adaptation, feedback of channel status information of the user equipment is required.

1 Channel Status Information (CSI)

Feedback of channel information is required for efficient communication, and in general, downlink channel information is transmitted through the uplink and uplink channel information is transmitted through the downlink. Channel information representing a status of a channel is referred to as the channel status information and the channel status information includes a precoding matrix index (PMI), a rank indicator (RI), a channel quality indicator (CQI), and the like.

2. Downlink Transmission Mode.

The downlink transmission mode may be divided into 9 modes to be described below.

Transmission mode 1: Single antenna port, port 0

Transmission mode 2: Transmit diversity

Transmission mode 3: Open loop spatial multiplexing. The transmission mode 3 is an open loop mode in which rank adaptation is available based on RI feedback. When a rank is 1, the transmit diversity may be applied. When the rank is larger than 1, a large delay CDD may be used.

Transmission mode 4: Closed loop spatial multiplexing or transmit diversity

Transmission mode 5: Transmit diversity or multi-user MIMO

Transmission mode 6: Transmit diversity or closed loop spatial multiplexing having a single transmission layer Transmission mode 7: If the number of physical broadcast channel (PBCH) antenna ports is 1, a single antenna port (port 0) is used and if not, the transmit diversity is used. Alternatively, single antenna transmission (port 5)

Transmission mode 8: If the number of PBCH antenna ports is 1, the single antenna port (port 0) is used and if not, the transmit diversity is used. Alternatively, dual layer transmission using antenna ports 7 and 8 or single antenna port transmission using port 7 or 8.

Transmission mode 9: Transmission of maximum 8 layers (ports 7 to 14).

In the case of not a multicast-broadcast single frequency network (MBSFN) subframe, if the number of PBCH antenna ports is 1, the single antenna port (port 0) is used and if not, the transmit diversity is used.

In the case of the MBSFN subframe, single antenna port transmission (port 7).

3. Periodic Transmission of CSI.

The CSI may be transmitted through the PUCCH periodically according to a cycle determined in the higher layer. The user equipment may be semistatically by a higher layer signal so as to periodically feed back a differential CSI (CQI, PMI, RI) through the PUCCH. In this case, the user equipment transmits the corresponding CSI according to modes defined as shown in a table given below.

TABLE 5

|  |  | PMI Feedback Type | |
|---|---|---|---|
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

A periodic CSI reporting mode in the PUCCH described below is supported for each of the aforementioned transmission modes.

TABLE 6

| Transmission mode | PUCCH CSI reporting modes |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is set for modes 1-1 and 2-1 user equipments; When PMI/RI reporting is not set for modes 1-0 and 2-0 user equipments |
| Transmission mode 9 | When PMI/RI reporting is set for the modes 1-1 and 2-1 user equipments and the number of CSI-RS ports is larger than 1. When PMI/RI reporting is not set for the modes 1-0 and 2-0 user equipments or the number of CSI-RS ports is 1 |

Meanwhile, a collision of the CSI report represents a case in which a subframe configured to transmit a first CSI and a subframe configured to transmit a second CSI are the same as each other. When the collision of the CSI report occurs, the first CSI and the second CSI are simultaneously transmitted or transmission of a CSI having a low priority is abandoned (this will be referred to as drop) and a CSI having a high priority may be transmitted according to priorities of the first CSI and the second CSI.

The CSI report through the PUCCH may include various report types according to a transmission combination of the CQI, the PMI, and the RI and a cycle and an offset value divided according to each report type (hereinafter, abbreviated as a type) are supported.

Type 1: Supports CQI feedback for a subband selected by the user equipment.

Type 1a: Supports subband CQI and second PMI feedback.

Types 2, 2b, and 2c: Supports wideband CQI and PMI feedback.

Type 2a: Supports the wideband PMI feedback.

Type 3: Supports RI feedback.

Type 4: Transmits the wideband CQI.

Type 5: Supports RI and wideband PMI feedback.

Type 6: Supports RI and PTI feedback.

For each serving cell, $N_{pd}$ which is a subframe-unit cycle and an offset $N_{offset,CQI}$ are determined based on a parameter 'cqi-pmi-ConfigIndex' ($I_{CQI/PMI}$) for CQI/PMI reporting. Further, for each serving cell, period $M_{RI}$ and a relative offset $N_{offset,RI}$ are determined based on a parameter 'ri-ConfigIndex' ($I_{RI}$) for RI reporting. 'cqi-pmi-ConfigIndex' and 'ri-ConfigIndex' are set by the higher layer signal such as the RRC message. The relative offset $N_{offset,RI}$ for the RI has a value in a set $\{0, -1, \ldots, -(N_{pd}-1)\}$.

A subframe in which the user equipment reports the CSI is referred to as a CSI subframe and a CSI subframe set constituted by a plurality of CSI subframes may be configured for the user equipment. If reporting is configured in two or more CSI subframe sets for the user equipment, 'cqi-pmi-ConfigIndex' and 'ri-ConfigIndex' corresponding to the respective CSI subframe sets are given. For example, when CSI reporting is configured in two CSI subframe sets, 'cqi-pmi-ConfigIndex' and 'ri-ConfigIndex' are for a first CSI subframe set and 'cqi-pmi-ConfigIndex2' and 'ri-ConfigIndex2' are for a second CSI subframe set.

When a CSI report which CSI type 3, 5, or 6 for one serving cell and a CSI report which is CSI type 1, 1a, 2, 2a, 2b, 2c, or 4 for one serving cell collide with each other, the CSI report which is the CSI type 1, 1a, 2, 2a, 2b, 2c, or 4 has a low priority and is dropped.

When two or more serving cells are configured for the user equipment, the user equipment performs only CSI reporting for only one serving cell in a given subframe. The CSI report which is the CSI type 3, 5, 6, or 2a of a first cell and the CSI report which is the CSI type 1, 1a, 2, 2a, 2b, 2c, or 4 of a second cell may collide with each other in the given subframe. In this case, the CSI report which is the CSI type 1, 1a, 2, 2a, 2b, 2c, or 4 has the low priority and is dropped.

A CSI report which is CSI type 2, 2b, 2c, or 4 of the first cell and a CSI report which is CSI type 1 or 1a of the second cell may collide with each other in the given subframe. In this case, the CSI report which is the CSI type 1 or 1a has the low priority and is dropped. The first cell and the second cell are different cells.

CSI type CSI reports having the same priority in different serving cells may collide with each other in the given subframe. In this case, a CSI of a serving cell having the lowest serving cell index (ServCellIndex) is reported and CSIs of all other serving cells are dropped.

[Periodic/Aperiodic SRS]

A sounding reference signal (SRS) is a reference signal not associated with PUSCH/PUCCH transmission and the SRS may be transmitted in the uplink. The transmission of the SRS includes a Type0 scheme and a Type1 scheme. In the case of the Type0 scheme as a scheme in which the SRS is transmitted according to a set cycle, the SRS is semistatically transmitted at the corresponding cycle according to a predetermined cycle. In the case of the Type1 scheme as a scheme in which the SRS is aperiodically transmitted by triggering, a triggering signal is included in a downlink control signal (downlink control information (DCI)).

In both two schemes, an SRS transmittable subframe is cell-specifically configured and the user equipment is capable of transmitting the SRS in only the corresponding subframe.

Hereinafter, the present invention will be described.

As described above, when periodic CQI transmission and A/N transmission collide with each other in a subframe without transmitting the PUSCH in LTE release 8, if simultaneous transmission of the periodic CQI and the A/N is configured, the periodic CQI and the A/N are simultaneously transmitted by using the PUCCH format 2a/2b. In detail, the A/N is multiplexed by modulating a phase of a second reference signal symbol of the PUCCH format 2.

However, in the LTE-A, a plurality of A/N for the plurality of PDSCHs (for example, PDSCHs received in a plurality of cells) needs to be transmitted. That is, in the LTE-A, since information amount of the A/N increases, a multiplexing method of the A/N and the CQI through a phase modulation scheme of a reference signal symbol in the related art may not be appropriate.

Hereinafter, when the periodic CSI, A/N, SR, and the like are configured to be simultaneously transmitted through the same uplink control channel, disclosed are by what scheme the periodic CSI, A/N, SR, and the like are to be multiplexed and a method for selecting a control channel resource depending on UCI configuration. The UCI is a term that generically names the periodic CSI, A/N, SR, and the like.

Such a method considers an operation which is strong to ambiguity in RRC reestablishment to configure simultaneous transmission of the A/N and the CSI or cancel the simultaneous transmission for the user equipment.

Hereinafter, the CSI may be limited to the periodic CSI. Further, the PUCCH format 3 is exemplified as an uplink channel in which control information such as the A/N and the CSI is multiplexed and transmitted, but the uplink channel is not limited thereto. For example, the present invention may be applied to even a new PUCCH format or PUSCH transmission acquired by modifying a coding chain, RE mapping, and the like of the PUCCH format 3.

<Selection of Transmission Resource Depending on UCI Combination in Configuring Simultaneous Transmission of A/N and CSI>

The user equipment may be configured to multiplexing and simultaneously transmit A/N for a plurality of cells (a plurality of DL CCs) and periodic CSIs for one or a plurality of cells (that is, one or a plurality of DL CCs). As described above, when the UCI is transmitted through a control channel, the user equipment may select a transmission resource of the control channel according to a combination of UCIs to be transmitted.

1. Transmission Method when Only A/N is Generated

1) When the PUCCH format 3 is configured to transmit A/N for a plurality of cells in frequency division duplex (FDD).

In this case, the user equipment follows an A/N transmitting method of LTE-A release 10. That is, in a DL subframe (for example, subframe n-k, k=4) corresponding to a UL subframe (for example, subframe n) to transmit the A/N, i) when one PDSCH exists in only the PCC and is scheduled without the PDCCH (for example, PDSCH scheduled by the SPS), ii) when one PDSCH exists in only the PCC and is scheduled through the PDCCH, or iii) when one PDCCH exists in only the PCC and the PDCCH requires an A/N response (for example, a downlink SPS release PDCCH), the PUCCH format 1a/1b may be used.

The PUCCH format 1a/1b may be defined to be used when an ACK/NACK resource indicator (to be described below) required to select the resource of the PUCCH format 3 may not be received from the PDCCH. An A/N for the conditions of i) to iii) or the case in which the ARI may not be received in the FDD may be hereinafter referred to as a single ACK/NACK (sA/N).

iv) An A/N for cases other than the conditions of i) to iii) or the ARI reception unavailable condition may be hereinafter referred to as a multiple ACK/NACK (mA/N). For example, when the ARI for selecting the resource of the PUCCH format 3 is received from the PDCCH, the transmitted A/N may be referred to as the mA/N.

The user equipment may transmit the A/N by using the PUCCH format 3.

When an implicit PUCCH resource corresponding to a CCE occupied by the PDCCH exists as described in ii) and iii), the resource is used and when the implicit PUCCH resource does not exist as described in i) and iv), one resource indicated by the ARI included in the PDCCH is selected and used from four explicit PUCCH resources allocated through the RRC. In the case of iv), the PUCCH format 3 resource allocated through the RRC may be similarly used upon multi CSI transmission.

2) When the PUCCH format 1a/1b channel selection is configured to transmit the A/N for the plurality of cells in the FDD. In this case, the user equipment follows a channel selecting method of the LTE-A release 10.

3) When the PUCCH format 3 is configured to transmit the A/N for the plurality of cells in time division duplex (TDD).

In a DL subframe (e.g., defined in table 10.1.3.1-1 of subframe n-k, k∈K, K is 3GPP TS 36.213, V10, Evolved Universal Terrestrial Radio Access (E-UTRA); physical layer procedures (Release 10) and a set constituted by M elements, that is, $\{k_0, k_1, \ldots, k_{M-1}\}$) corresponding to the UL subframe (e.g., subframe n) to transmit the A/N, i) when one PDSCH scheduled without the PDCCH exists only in the PCC and there is no PDCCH requiring the A/N response, ii) when one PDSCH scheduled through the PDCCH exists only in the PCC and the DAI of the corresponding PDCCH is 1, or iii) when one PDCCH (e.g., the downlink SPS release PDCCH, hereinafter, the same as above) having the DAI of 1, which requires the A/N response exists and there is no PDSCH, the PUCCH format 1a/1b is used.

iv) When one PDCCH having the DAI of 1, which requires the A/N response exists or one PDSCH scheduled through the PDCCH exists only in the PCC and the DAI of the corresponding PDCCH is 1, and one PDSCH scheduled without the PDCCH exists, the PUCCH format 1a/1b channel selection is used.

In this case, a first HARQ-ACK corresponds to a PDSCH transmitted without the PDCCH, a second HARQ-ACK corresponds to a first codeword of the PDSCH in which PDCCH DAI=1 or the downlink SPS release PDCCH, and a third HARQ-ACK corresponds to a second codeword of the PDSCH scheduled through the PDCCH having the DAI of 1.

The PUCCH format 1a/1b or PUCCH format 1a/1b channel selection may be defined to be applied when the ARI for selecting the resource of the PUCCH format 3 may not be received from the PDCCH. In the TDD, the conditions of i) to iv) may be referred to as the single A/N (sA/N) for easy description. In the case of iv), an exceptional method may be applied unlike the conditions i) to iii) (even in the case of the collisions of the SR and the CSI).

v) An A/N transmitted in cases other than i) to iv) may be referred to as the multiple ACK/NACK (mA/N). For example, when the ARI for selecting the resource of the PUCCH format 3 may be received from the PDCCH, the transmitted A/N may be referred to as the mA/N.

The user equipment may transmit the A/N by using the PUCCH format 3. When the implicit PUCCH resource corresponding to the CCE occupied by the PDCCH exists as described (some of ii), iii), and iv)), the implicit resource is used and when the implicit PUCCH resource does not exist (some of i), v), and iv)), one resource indicated by the ARI included in the PDCCH is selected and used from four explicit PUCCH resources allocated through the RRC.

2. Transmission Method when Only CSI Occurs

When only the CSI for one cell (one CC) is transmitted without the A/N, the CSI may be transmitted in the PUCCH format 2. When the plurality of CSIs is used, the PUCCH format 3 may be used. The PUCCH format 3 may be separately allocated.

3. Transmission Method Upon Simultaneous Transmission of A/N and CSI

1) When the PUCCH format 3 is configured to be used for transmitting the A/N for multiple cells or the PUCCH format 1a/1b channel selection is configured to be used for transmitting the A/N for the multiple cells.

The A/N transmission is required in a UL subframe (for example, subframe n) to transmit the CSI for the DL CC, and in a DL subframe (for example, subframe n-k, k=4) corresponding to the UL subframe, when one PDSCH exists in only the PCC and is scheduled without the PDCCH (for example, PDSCH scheduled by the SPS), ii) when one PDSCH exists in only the PCC and is scheduled through the PDCCH, or iii) when one PDCCH exists in only the PCC and the PDCCH requires the A/N response (for example, the downlink SPS release PDCCH), in the case where the subframe n uses the normal CP, the CSI is transmitted in the PUCCH format 2 and the A/N is transmitted through reference signal symbol modulation of the PUCCH format 2. That is, the CSI and the A/N are simultaneously transmitted by using the PUCCH format 2a/2b. When the extended CP is used, the CSI and the A/N are joint-coded to be transmitted in the PUCCH format 2. Alternatively, the CSI and the A/N may be simultaneously transmitted through the PUCCH format 3. This may be applied when multi CSI transmission is configured or the PUCCH format 3 is allocated for transmitting only the CSI. The aforementioned method may be applied when the ARI for selecting the resource of the PUCCH format 3 may be received from the PDCCH.

iv) indicates the case in which the ARI for selecting the resource of the PUCCH format 3 may be received from the PDCCH, as a case other than i) to iii).

The user equipment may multiplex and transmit the CSI and the A/N through the PUCCH format 3. In this case, the A/N may be bundled and compressed for the multiplexing the CSI.

The CSI may be a CSI for one or the plurality of cells (DL CCs). When the CSI for the plurality of DL CCs is permitted to be transmitted, if the conditions i) to iii) are satisfied in a subframe in which the plurality of CSI transmissions collide with each other, only a CSI for one DL CC may be selected and transmitted and residual DL CCs may be dropped. In this case, the aforementioned PUCCH formats 2 and 3 may be used. Alternatively, the CSIs for the plurality of DL CCs may be transmitted through the PUCCH format 3. Alternatively, in the case of iv), the A/N and the CSI are multiplexed to be transmitted through the PUCCH format 3.

Alternatively, in a subframe in which a single CSI is generated, the PUCCH format 2 series (PUCCH format 2/2a/2b) is used and in a subframe in which multiple CSIs are generated, the CSIs may be transmitted simultaneously together with the A/N.

2) When the PUCCH format 3 is configured for transmitting the A/N for the plurality of cells or the PUCCH format 1a/1b channel selection is configured for transmitting the A/N for the plurality of cells in the TDD.

The A/N transmission is required in a UL subframe (e.g., subframe n) to transmit the CSI for the DL CC, and in a DL subframe (e.g., defined in table 10.1.3.1-1 of subframe n-k, k∈K, K is 3GPP TS 36.213, V10, Evolved Universal Terrestrial Radio Access (E-UTRA); physical layer procedures (Release 10) and a set constituted by M elements, that is, $\{k_0, k_1, \ldots, k_{M-1}\}$) corresponding to the UL subframe (e.g., subframe n) to transmit the A/N, i), when one PDSCH scheduled without the PDCCH exists only in the PCC and there is no PDCCH requiring the A/N response, ii) when one PDSCH scheduled through the PDCCH exists only in the PCC and the DAI of the corresponding PDSCH is 2, or iii) when one PDCCH (e.g., the downlink SPS release PDCCH, hereinafter, the same as above) having the DAI of 1, which requires the A/N response exists and there is no PDSCH, the CSI is transmitted in the PUCCH format 2 in the case where the subframe n uses the normal CP and the A/N is transmitted through the reference signal symbol modulation of the PUCCH format 2. That is, the CSI and the A/N are simultaneously transmitted by using the PUCCH format 2a/2b. When the extended CP is used, the CSI and the A/N are joint-coded to be transmitted in the PUCCH format 2. The A/N may be transmitted in a bundling form. Alternatively, when the multiple CSI transmissions are configured or the PUCCH format 3 is allocated for transmitting only the CSI, the user equipment may simultaneously transmit the CSI and the A/N by using the PUCCH format 3 (method 1).

iv) When one PDCCH having the DAI of 1, which requires the A/N response exists or one PDSCH scheduled through the PDCCH exists only in the PCC and the DAI of the corresponding PDCCH is 1, and one PDSCH scheduled without the PDCCH exists, the CIS is dropped and only the A/N is transmitted by using the PUCCH format 1a/1b channel selection. In this case, a first HARQ-ACK corresponds to a PDSCH transmitted without the PDCCH, a second HARQ-ACK corresponds to a first codeword of the PDSCH in which PDCCH DAI=1 or the downlink SPS release PDCCH, and a third HARQ-ACK corresponds to a second codeword of the PDSCH scheduled through the PDCCH having the DAI of 1.

Methods applied to i) to iv) may be determined to be applied when the ARI for selecting the resource of the PUCCH format 3 may not be received from the PDCCH.

Alternatively, in the case of iv), any one of methods 2-1 to 2-5 described below may be selected and used.

When the subframe n uses the normal CP, the CSI is transmitted in the PUCCH format 2 and the A/N is transmitted through the reference signal symbol modulation of the PUCCH format 2. That is, the CSI and the A/N are transmitted by using the PUCCH format 2a/2b. When the extended CP is used, the CSI and the A/N are joint-coded to be transmitted in the PUCCH format 2. Alternatively, when the multiple CSI transmissions are configured, the CSI and the A/N may be simultaneously transmitted by using the PUCCH format 3.

2-1. In the case of the A/N, the A/N for 'the case in which one PDCCH having the DAI of 1, which requires the A/N response exists or one PDSCH scheduled through the PDCCH exists only in the PCC and the DAI of the corresponding PDCCH is 1 may be dropped and the A/N for "the PDSCH scheduled (by the SPS) without the PDCCH" may be transmitted.

2-2. In the case of the A/N, the A/N for 'the case in which one PDCCH having the DAI of 1, which requires the A/N response exists or one PDSCH scheduled through the PDCCH exists only in the PCC and the DAI of the corresponding PDCCH is 1 may be transmitted and the A/N for "the PDSCH scheduled (by the SPS) without the PDCCH" may be dropped.

2-3. In the case of the A/N, the A/N for 'the case in which one PDCCH having the DAI of 1, which requires the A/N response exists or one PDSCH scheduled through the PDCCH exists only in the PCC and the DAI of the corresponding PDCCH is 1 and the A/N for "the PDSCH scheduled (by the SPS) without the PDCCH" may be bundled and transmitted.

2-4. In the case of the A/N, the A/N for 'the case in which one PDCCH having the DAI of 1, which requires the A/N response exists or one PDSCH scheduled through the PDCCH exists only in the PCC and the DAI of the corresponding PDCCH is 1 is spatially bundled and the A/N for "the PDSCH scheduled (by the SPS) without the PDCCH" is spatially bundled to be transmitted as 2 bits. Each A/N is mapped to a predetermined constellation point (for example, the former is mapped to I-phase and the latter is mapped to Q-phase). Additionally, by considering a case in which the PDCCH may not be received, the A/N is spatially bundled to be mapped to a predetermined constellation point (for example, I-phase) in the case of ii) and iii) and the A/N is spatially bundled to be mapped to a predetermined constellation point (for example, Q-phase).

2-5. The A/N may be transmitted by spatially bundling the A/N of each DL subframe of each CC and additionally, time-domain bundling the A/N. The time-domain bundling may include temporal bundling, an ACK counter, and a contiguous ACK counter, for the entirety of the PCC (if the SPS may be configured even in the SCC, the SCC is also included as well as the PCC to be extended up to frequency-domain bundling).

Alternatively, the following method may be applied to i) to iv).

When the subframe n uses the normal CP, the CSI is transmitted in the PUCCH format 2 and the A/N is transmitted through the reference signal symbol modulation of the PUCCH format 2. That is, the CSI and the A/N are simultaneously transmitted by using the PUCCH format 2a/2b. When the subframe n uses the extended CP, the CSI and the A/N are joint-coded to be transmitted in the PUCCH format 2. Alternatively, when the multiple CSI transmissions are configured or the PUCCH format 3 is allocated for transmitting only the CSI, the CSI and the A/N may be simultaneously transmitted by using the PUCCH format 3. Herein, the A/N may be acquired by spatially bundling the A/N of each DL subframe of each CC. Further, additionally, the A/N may be time-domain bundled (method 1-1).

v) in the case (may be defined as the case in which the ARI for selecting the resource of the PUCCH format 3 may be received from the PDCCH) other than i) to iv). In this case, the CSI and the A/N are multiplexed and transmitted through the PUCCH format 3. Herein, the A/N may be transmitted in a bundling form for each DL CC (method 3).

The CSI may be a CSI for one or the plurality of DL CCs. When the CSI for the plurality of DL CCs is permitted to be transmitted, in a subframe in which the plurality of CSIs collide with each other, only the CSI for one DL CC is selected and residual CSIs are dropped to use a method in which the PUCCH format 2 or 3 series is applied in method 1 or 2, methods 2-1, 2-2, 2-3, 2-4, and 2-5, method 1-1 which is an integration method of i) to iv). Alternatively, a plurality of (for example, two, some CSIs may be dropped in some cases) CSIs may use a method in which the PUCCH format 3 series in method 1 or 2, methods 2-1, 2-2, 2-3, 2-4, and 2-5, or method 1-1 may be used and method 3 (that is, the A/N and the plurality of CSIs are transmitted) may be used in the case of v). Further, a method may also be considered, in which in the subframe in which the single CSI is generated, the PUCCH format 2 series is used and in the subframe in which multiple CSIs are generated, the PUCCH format 3 series is used to multiplex the A/N and the CSI.

3) When the PUCCH format 1a/1b channel selection is configured to transmit the A/N for the plurality of cells in the TDD.

The A/N transmission is required in the UL subframe (e.g., subframe n) to transmit the CSI for the DL CC, and in in a DL subframe (e.g., defined in table 10.1.3.1-1 of subframe n-k, k∈K, K is 3GPP TS 36.213, V10, Evolved Universal Terrestrial Radio Access (E-UTRA); physical layer procedures (Release 10) and a set constituted by M elements, that is, $\{k_0, k_1, \ldots, k_{M-1}\}$) corresponding to the UL subframe (e.g., subframe n) to transmit the A/N, i) when the PDSCH or the PDCCH requiring the A/N response is received only in the PCC, the CSI and the A/N may be multiplexed and transmitted in the PUCCH format 2b. Herein, the A/N for the plurality of DL subframes of the PCC may be in a bundled (method 1).

ii) in other cases (that is, a case in which an A/N for PDSCH reception in the SCC exists), the CSI and the A/N may be multiplexed and transmitted in the PUCCH format 3. In this case, the A/N may be bundled for each DL CC (method 2).

Further, the CSI may be a CSI for one or the plurality of DL CCs. When the CSI for the plurality of DL CCs is permitted to be transmitted, in a subframe in which the plurality of CSIs collide with each other, only the CSI for one DL CC is selected and residual CSIs are dropped in the case of i) to apply the PUCCH formats 2 and 3 series in the method 1. The method in which the PUCCH format 3 series in the method 1 is applied may be used for the plurality of CSIs and the method 2 may be used in the case of ii). Further, a method may also be considered, in which in the subframe in which the single CSI is generated, the PUCCH format 2 series is used and in the subframe in which multiple CSIs are generated, the PUCCH format 3 series is used to multiplex the A/N and the CSI.

4. Transmission Method Upon Simultaneous Transmission of A/N and SR.

1) When the PUCCH format 3 is configured to be used for transmitting A/N for the multiple cells in the FDD.

The UL subframe (for example, subframe n) is an SR subframe scheduled to transmit the SR and requires the A/N transmission and in the DL subframe (for example, subframe n-k, k=4) corresponding to the UL subframe, i) when one PDSCH exists in only the PCC and is scheduled without the PDCCH (for example, PDSCH scheduled by the SPS), ii) when one PDSCH exists in only the PCC and is scheduled through the PDCCH, or iii) when one PDCCH exists in only the PCC and the PDCCH requires the A/N response (for example, the downlink SPS release PDCCH), in the case where the SR is the positive SR, the A/N is transmitted in the PUCCH format 1a/1b allocated by the RRC message for the positive SR and in the case where the SR is the negative SR, the same transmission method as when only the A/N is transmitted is used.

iv) in cases other than i) to iii), the A/N and the SR bit are multiplexed and transmitted in the PUCCH format 3.

2) When the PUCCH format 1a/1b channel selection is configured to be used for transmitting the A/N for the multiple cells in the FDD.

The UL subframe (for example, subframe n) is the SR subframe scheduled to transmit the SR and requires the A/N transmission, and when the SR to be transmitted in the UL subframe is the positive SR, an A/N (2 bits) to which the spatial bundling is applied for each DL CC is transmitted in the PUCCH format 1b allocated by the RRC message for the positive SR and when the SR is the negative SR, the same transmission method as when only the A/N is transmitted is used.

3) When the PUCCH format 3 is configured for transmitting A/N for the multiple cells in the TDD.

The UL subframe (e.g., subframe n) is the SR subframe scheduled to transmit the SR and requires the A/N transmission, and in a DL subframe (e.g., defined in table 10.1.3.1-1 of subframe n-k, k∈K, K is 3GPP TS 36.213, V10, Evolved Universal Terrestrial Radio Access (E-UTRA); physical layer procedures (Release 10) and a set constituted by M elements, that is, $\{k_0, k_1, \ldots, k_{M-1}\}$) corresponding to the UL subframe (e.g., subframe n) to transmit the A/N, i) when one PDSCH scheduled without the PDCCH exists only in the PCC and there is no PDCCH requiring the A/N response, ii) when one PDSCH scheduled through the PDCCH exists only in the PCC and the DAI of the corresponding PDSCH is 1, iii) when one PDCCH (e.g., the downlink SPS release PDCCH, hereinafter, the same as above) having the DAI of 1, which requires the A/N response exists and there is no PDSCH, or iv) 'when the PDCCH having the DAI of 1, which requires the A/N response exists' or 'one PDSCH scheduled through the PDCCH exists only in the PCC and the DAI of the corresponding PDCCH is 1', and one PDSCH scheduled without the PDCCH exists, in the case where the SR is the positive SR, the A/N for each DL subframe of each DL CC is spatially bundled (time-domain bundling is also available) and transmitted in the PUCCH format 1a/1b allocated by the RRC message for the positive SR and in the case where the SR is the negative SR, the same transmission method as when only the A/N is transmitted is used (method 1).

The method 1 may be determined to be used when the ARI for selecting the resource of the PUCCH format 3 may not be received from the PDCCH.

v) In cases other than i) to iv), the A/N and the SR bit are multiplexed and transmitted through the PUCCH format 3. v) may a case in which the ARI for selecting the resource of the PUCCH format 3 may be received from the PDCCH.

4) When the PUCCH format 1a/1b channel selection is configured to transmit the A/N for the plurality of cells in the TDD.

in the case where the SR is the positive SR, the A/N for each DL subframe of each DL CC is spatially bundled (time-domain bundling/frequency-domain bundling is also available, and temporal bundling, the ACK counter, and the contiguous ACK counter for the entirety of the PCC and the SCC may be applied) and transmitted in the PUCCH format 1a/1b allocated by the RRC message for the positive SR and in the case where the SR is the negative SR, the same transmission method as when only the A/N is transmitted is used.

5. Transmission Method Upon Simultaneous Transmission (Collision) of SR and CSI.

1) When the positive SR and periodic CSI transmission in the SR subframe collide with each other, the PUSCH transmission exists, and the simultaneous transmission of the PUCCH and the PUSCH is configured, the CSI may be fed back through the PUSCH. In other cases, the CSI is dropped and the SR is transmitted in the PUCCH format 1 allocated by the RRC message for the positive SR. In the case where the SR is the negative SR, the transmission method when only the CSI is generated is followed.

2) In the SR subframe, the SR bit and the CSI are multiplexed and transmitted in the PUCCH format 3. In particular, in this case, as the PUCCH format 3 resource, the resource allocated by the RRC is used for transmitting the CSI when the ARI may not be received from the PDCCH of the DL subframe corresponding to a subframe corresponding to a periodic CSI transmission cycle. When the dual RM or the single RM coding is used, a bit (e.g., 1 bit) for the SR may be preferentially placed (in MSB) and thereafter, the CSI may be placed. When the PUCCH format 2 is used upon transmitting the single CSI (this corresponds to even a case in which only one CSI remains by collision of the multiple CSIs, the SR bit and the CSI are multiplexed to be transmitted in the PUCCH format 2.

1) and 2) may be applied when the PUCCH format 2b channel selection is configured and the PUCCH format 3 is configured in order to transmit only the mA/N.

6. Transmission method upon simultaneous transmission (collision) of A/N, SR, and CSI 1) In FDD/TDD, in the case where the UL subframe (e.g. subframe n) is an SR subframe and simultaneously overlaps with a periodic CSI transmission cycle for the DL CC, and A/N transmission is required, When the SR is a positive SR, the CSI is dropped, and the SR follows a transmission method during the aforementioned collision of the A/N and the SR. When the SR is a negative SR, the SR follows a transmission method during the aforementioned collision of the A/N and the CSI.

2) In FDD/TDD, in the case where the UL subframe (e.g. subframe n) is an SR subframe and simultaneously overlaps with a periodic CSI transmission cycle for the DL CC, and A/N transmission is required, when the PUCCH format 3 for transmission of the A/N and the CSI is used, the A/N, the SR bit, and the CSI are multiplexed and transmitted. In other cases, when the SR is a positive SR, the CSI is dropped, and the SR follows a transmission method during the aforementioned collision of the A/N and the SR. When the SR is a negative SR, the SR follows a transmission method during the aforementioned collision of the A/N and the CSI. Each case is divided and described.

2-1) In FDD, in the case where the use of the PUCCH format 3 for A/N transmission for multi cells is set: When the UL subframe (e.g. subframe n) is an SR subframe and simultaneously overlaps with a periodic CSI transmission cycle for the DL CC, and A/N transmission is required, in a DL subframe (for example, subframe n-k, k=4) corresponding to the UL subframe, i) one PDSCH exists only in the PCC and is scheduled without the PDCCH (as the SPS), ii) one PDSCH exists only in the PCC and is scheduled as the PDCCH, or iii) one PDCCH exists only in the PCC and the PDCCH requires an A/N response (ex. downlink SPS release PDCCH), the following method may be applied. That is, when the SR is the positive SR, the CSI is dropped, and the A/N is transmitted through a PUCCH format 1a/1b allocated to the RRC for the positive SR. When the SR is a negative SR, the A/N is transmitted similarly as the transmission method upon the aforementioned collision of the A/N and the CSI. This method may be defined to be used to a case where the ARI for selection of the PUCCH format 3 may not be received from the PDCCH.

iv) In other cases (that is, a case where the ARI for selection of the PUCCH format 3 resource may be received), the A/N, the SR bit, and the CSI are multiplexed and transmitted through the PUCCH format 3. The method may be applied to a case where the use of the PUCCH format 1a/1b channel selection is set.

2-2) In FDD, in the case where the use of the PUCCH format 1a/1b channel selection for A/N transmission for multi cells is set: When the UL subframe (e.g. subframe n) is an SR subframe and simultaneously overlaps with a periodic CSI transmission cycle for the DL CC, and A/N transmission is required, and the SR to be transmitted in the UL subframe is the positive SR, the CSI is dropped, and the A/N(2 bit) applying spatial bundling for each DL CC is mapped and transmitted to the PUCCH format 1b allocated to the RRC for the positive SR. When the SR is a negative SR, the/N is transmitted similarly as the transmission method upon the aforementioned collision of the A/N and the CSI. Such a method is applied only the cases such as the aforementioned conditions i), ii), and iii), and in the case such as the condition iv), the A/N, the SR bit, and the CSI may be multiplexed and transmitted through the PUCCH format 3.

2-3) In TDD, in the case where the use of the PUCCH format 3 for A/N transmission for multi cells is set: When the UL subframe (e.g. subframe n) is an SR subframe and simultaneously overlaps with a periodic CSI transmission cycle for the DL CC, and A/N transmission is required, in a DL subframe (for example, subframe n-k, k∈K, K is a set defined in Table 10.1.3.1-1 of 3GPP TS 36.213. V10, Evolved Universal Terrestrial Radio Access (E-UTRA)) and configured by M elements, that is, $\{k_0, k_1, \ldots, k_{M-1}\}$) corresponding to the UL subframe, i) one PDSCH scheduled without the PDCCH exists only in the PCC and there is no PDCCH requiring the A/N response, ii) one PDSCH scheduled without the PDCCH exists only in the PCC and DAI=1 of the corresponding PDSCH, iii) one PDCCH (for example, the downlink SPS release PDCCH, hereinafter the same) which is DAI=1 requiring the A/N response exists and there is no PDSCH, or iv) 'the PDSCH which is DAI=1 requiring the A/N response exists', 'one PDSCH scheduled as the PDCCH exists only in the PCC and DAI=1 of the corresponding PDSCH, or one PDSCH scheduled without the PDCCH exists, in the case where the SR is the positive SR, the CSI is dropped, and the same method as the transmission method upon the aforementioned collision of the A/N and the CSI is used. That is, in the PUCCH format 1a/1b allocated by an RRC message for the positive SR, the A/N for each DL subframe of each DL CC is transmitted through spatial bundling (time area bundling is possible, and frequency area bundling including the PCC and the SCC is possible), and in the case of the negative SR, the same method as the transmission method during the collision of the A/N and the CSI is used. This method may be defined to be used to a case where the ARI for selection of the PUCCH format 3 resource may not be received from the PDCCH.

v) In a case other than i) to iv), the A/N, the SR bit, and the CSI are multiplexed and transmitted through the PUCCH format 3.

2-4). 2-4) In TDD, in the case where the use of the PUCCH format 1a/1b channel selection for A/N transmission for multi cells is set: When the UL subframe (e.g. subframe n) is an SR subframe and simultaneously overlaps with a periodic CSI transmission cycle for the DL CC, and A/N transmission is required, and the SR to be transmitted in the UL subframe is the positive SR, the CSI is dropped, and the A/N of the PCC and the SCC may be transmitted through the PUCCH format 1b allocated to the RRC for the positive SR. Here, the A/N may be transmitted as a bundled form. (For example, time bundling, an ACK counter, a continuous ACK counter, and the like for the PCC and the SCC), in the case where the SR is the negative SR, the A/N may be transmitted in the same method as the transmission method during the A/N and the CSI. Such a method is applied only the cases such as the aforementioned conditions i) to iv), and in the case such as the condition v), the A/N, the SR bit, and the CSI may be multiplexed and transmitted through the PUCCH format 3.

In the transmission methods during the collision of the SR and the CSI or the collision of the A/N, the SR, and the CSI, in the case where the ARI may not be received from the PDCCH, when a PUCCH format 2 predefined for transmission of the CSI is used, the following method may be applied in the SR subframe.

Like the methods, in the case where the ARI may not be received from the PDCCH, 1) when the SR to be transmitted in the SR subframe is the positive SR, the CSI is dropped, and the SR and/or the A/N is transmitted to the PUCCH format 1/1a/1b allocated to the RRC for the positive SR. Alternatively, 2) the SR bit and the CSI in the SR subframe is multiplexed (for example, joint coding) and transmitted to the PUCCH format 2 used for the CSI transmission. In this case, when a sum pf the SR bit and the CSI exceeds a predetermined bit number (for example, a maximum bit number to be transmitted by the PUCCH format 2/2a/2b, 11 bits or 13 bits), the CSI is dropped, and only the A/N and the SR are transmitted to the PUCCH format 2/2a/2b (if there is the A/N), or the same method as the 1) method may be used.

Further, in the transmission methods during the collision of the SR and the CSI or the collision of the A/N, the SR, and the CSI, in the case where the ARI may not be received from the PDCCH, when a PUCCH format 3 predefined for transmission of a plurality of CSIs is used, the following method may be applied in the SR subframe.

1) In the case where the ARI may not be received from the PDCCH, when the SR to be transmitted in the SR subframe is the positive SR, the CSI is dropped, and the SR and/or the A/N is transmitted to the PUCCH format 1/1a/1b allocated to the RRC for the positive SR.

Alternatively, 2) the SR bit and the CSI in the SR subframe is multiplexed and transmitted to the PUCCH format 3 used for the CSI transmission. In this case, when a sum pf the SR bit and the CSI exceeds a predetermined bit number (for example, a maximum bit number to be transmitted by the PUCCH format 3, 22 bits), some CSIs are dropped, and the A/N and the SR, and a single CSI are transmitted to the PUCCH format 3 (if there is the A/N), or the same method as the 1) method may be used.

The spatial bundling may mean that the A/N for each codeword is compressed through a logic AND operation in the case where two codewords may be transmitted from one PDSCH. In the case of transmitting only one codeword or the PDCCH requiring one A/N, the spatial bundling for the A/N is not necessarily applied.

<Upon Simultaneous Transmission of A/N and CSI, Detection of ARI for PUCCH Format Resource>

In FDD/TDD, when the PUCCH format for multiplexing the A/N (and/or the SR bit) and the CSI (hereinafter, for convenience, referred to as a PUCCH format AC, and for example, the PUCCH format 3 may be the PUCCH format AC) is used, for flexibility of the resource selection, after a plurality (four) of resource sets are semi-statically allocated to a user equipment as the RRC, one resource of the allocated resource sets through the ARI (A/N resource indicator or PUCCH Resource Value for HARQ-ACK Resource for PUCCH, 2 bits) of the PDCCH may be dynamically indicated. To this end, the base station uses a TPC field of a predetermined PDCCH as the ARI, and this will be described as follows in more detail.

In FDD, the user equipment may receive the PUCCH format 3 used for the A/N transmission for the multi cells, or receive the PUCCH format 1a/1b channel selection use for the A/N transmission for the multi cells. In this case, in the UL subframe (subframe n) in which the A/N of the PDSCH transmitted to the SCC is transmitted, when the periodic CSI for the DL CC is set to be transmitted, the transmission power control (TPC) field of the PDCCH positioned in the DL subframe (subframe n-k (k=4)) corresponding to the corresponding PDSCH may be used as the ARI indicating the selection of the PUCCH format AC.

In TDD, in the case of receiving the PUCCH format 3 use for the A/N transmission for the multi cells, or receiving the PUCCH format 1a/1b channel selection use for the A/N transmission for the multi cells:

1) In the UL subframe (subframe n) in which 'the A/N for the PDSCH scheduled as the PDCCH having a DAI value larger than 1, transmitted to the PCC' or 'the A/N for the PDCCH (for example, the PDCCH notifying the downlink SPS release) having a DAI value larger than 1, in which the A/N response is required', in the case where the periodic CSI for the DL CC is set to be transmitted, the TPC field of the corresponding PDCCH, which is positioned in the DL subframe (subframe n-k (herein, k∈K, K is a set defined in Table 10.1.3.1-1 of 3GPP TS 36.213. V10, Evolved Universal Terrestrial Radio Access (E-UTRA)) and configured by M elements, that is, $\{k_0, k_1, \ldots, k_{M-1}\}$)), may be used as the ARI indicating the selection of the PUCCH format AC.

2) In the case where the periodic CSI for the DL CC is set to be transmitted to the UL subframe (subframe n) in which the A/N of the PDSCH transmitted to the SCC is transmitted, the TPC field of the corresponding PDCCH, which is positioned in the DL subframe (subframe n-k (herein, k∈K, K is a set defined in Table 10.1.3.1-1 of 3GPP TS 36.213. V10, Evolved Universal Terrestrial Radio Access (E-UTRA)) and configured by M elements, that is, $\{k_0, k_1, \ldots, k_{M-1}\}$)), may be used as the ARI indicating the selection of the PUCCH format AC.

In TDD, in the case of receiving the use of the PUCCH format 1a/1b channel selection for A/N transmission for multi cells: A different method from the aforementioned method may be applied. That is, in the case where the periodic CSI for the DL CC is set to be transmitted to the UL subframe (subframe n) in which the A/N of the PDSCH transmitted to the SCC is transmitted, the TPC field of the PDCCH, which is positioned in the DL subframe n-k (herein, k∈K, K is a set defined in Table 10.1.3.1-1 of 3GPP TS 36.213. V10, Evolved Universal Terrestrial Radio Access (E-UTRA)) and configured by M elements, that is, $\{k_0, k_1, \ldots, k_{M-1}\}$)), may be used as the ARI indicating the selection of the PUCCH format AC.

During non-cross-carrier scheduling, in the case of receiving the PUCCH format 1a/1b channel selection use for the A/N transmission, the ARI of the PDCCH, which is positioned in the DL subframe n-k corresponding to the UL subframe n (that is, is not the subframe of the periodic CSI transmission cycle) requiring only the A/N transmission, indicates the selection of the PUCCH format 1a/1b resource for the channel selection, while the ARI of the PDCCH, which is positioned in the DL subframe n-k corresponding to the UL subframe n in which simultaneous transmission of the A/N and the CSI is required, indicates the resource of the PUCCH format AC (for example, the PUCCH format 3) for the multiplexing transmission of the A/N and the CSI.

Further, in the case of receiving the PUCCH format 1a/1b channel selection use for the A/N transmission and during cross-carrier scheduling, the ARI does not exist in the PDCCH which is positioned in the DL subframe n-k corresponding to the UL subframe n in which only the A/N transmission is required, but the ARI indicating the resource of the PUCCH format AC for the simultaneous transmission of the A/N and the CSI exists in the PDCCH, which is positioned in the DL sub frame n-k corresponding to the UL subframe n in which simultaneous transmission of the A/N and the CSI is required.

Meanwhile, when the PUCCH format AC uses the structure of the PUSCH, the power control (PC) may use the PUSCH PC for data transmission. Accordingly, unlike the TPC field application of the existing PUCCH format 3 (some TPCs are used as the TPC, and only other cases are used as the ARI), the TPC of the PDCCH scheduling (or downlink SPS releasing) the PDSCH of all cells may be used as the ARI. Further, the ARI may directly indicate different kinds of PUCCH formats used as the PUCCH format for the A/N transmission. In this case, the ARI indicates a resource index of the same PUCCH format, and may select whether to use any PUCCH format among the formats defined as the predetermined RRC such as the PUCCH format 1a/1b, the PUCCH format 2, the PUCCH format 3, and the PUCCH format AC.

<Simultaneous Transmission of CSI and SRS>

In an existing LTE-A Rel-10, the simultaneous transmission in the same subframe of the PUCCH format 2/2a/2b for the SRS and CSI transmission is not permitted, and a method in which one of two is dropped and only one is transmitted according to the condition is applied. The reason is that a shortened format for avoiding the collision with the transmission of the SRS may not be made, because in the case of the PUCCH format 2/2a/2b, unlike the PUCCH format 1 or 3, an orthogonal cover is applied to the SC-FDMA symbol, the repetitively coded bits are not transmitted, and different coded bits are loaded and transmitted in each SC-FDMA symbol.

On the contrary, in the case of using the structure of the PUCCH format 3 or the PUSCH for the simultaneous transmission of the multi CSIs or in the case of using the PUCCH format 3 for the single CSI transmission, a configuration of the shortened format for avoiding the collision with the SRS is possible. Accordingly, the following SRC and CSI transmission method may be applied.

1) In the case of a type 0 SRS periodically set (when not using the shortened PUCCH format 3), during the collision with the CSI transmission in the same frame, the SRS is dropped at all times. In the case of a type 1 SRS aperiodically triggered, during the collision with the CSI transmission in the same frame, according to whether to include the HARQ-ACK transmission of the PUCCH format (PUCCH format 3 series) transmitted by the CSI, when the HARQ-ACK transmission is not generated, the CSI, is dropped, SRS transmission is selected, and when the HARQ-ACK transmission is included, the SRS is dropped and the HARQ-ACK is transmitted to the PUCCH format 3. Here, even though the HARQ-ACK transmission is not generated, in the case of reserving the HARQ-ACK bit field in the PUCCH format 3, the PUCCH is always transmitted and the SRS may be dropped.

2) (When the use of the shortened PUCCH format 3 is set, for example, when 'ackNackSRS-Simultaneous-Transmission'=TRUE) all types of SRSs periodically set are transmitted by using the shortened PUCCH format 3 for the transmission of the CSI during the collision with the CSI transmission in the same frame, and the SRC is transmitted to the last SC-FDM symbol of the corresponding subframe. The method is applied to all of the cases where the HARQ-ACK transmission is included or not included in the PUCCH format 3 together with the CSI. In the cell-specific SRS subframe, the shortened PUCCH format 3 may be always used. Here, exceptionally, when only the single CSI occurs, if the PUCCH format 2/2a/2b is used, only one of the CSI and the SRS like the aforementioned 1) is selectively transmitted.

An operation of the aforementioned 2) may be limited to be performed in only a case where the multi-CSI transmission is set (for example, a case of 'multiCellCQI-R12'=TRUE) or a case where the A/N and CSI transmission for the multi cells is set (for example, a case of 'simultaneousAckNackAndCQI-R11'=TRUE and 'simultaneousAckNackAndCQI'=TRUE), at the same time of 'ackNack-SRS-SimultaneousTransmission'=TRUE.

<Application for Setting the Simultaneous Transmission of the A/N and the CSI According to Capability of User Equipment>

In an existing LTE-A Rel-10, in a user equipment having capability for aggregating only two or less FDDs, the PUCCH format 3 for the A/N transmission is not implemented. In a user equipment having capability for aggregating only one or less TDD, the PUCCH format 3 for the A/N transmission is not implemented.

Accordingly, when the simultaneous transmission of the A/N (and/or the SR) and the CSI for the multi cells (in detail, the multi DL CCs and/or the multi subframes) is set, the use of a PUCCH format x (x is for example, 3, 3a, 4 . . . ) for simultaneous transmission may be applied as follows according to capability of the user equipment and/or a setting of the PUCCH format x for the A/N transmission.

1. According to user equipment capability, whether or not simultaneous transmission of the A/N (and/or the SR) and the CSI for the multi cells is set.

1) Permitted for Only a user equipment having capability of aggregating two or more (FDD) cells (corresponding to only the FDD, and in TDD, in the user equipment in which subcarrier aggregation is possible, the PUCCH format 3 is implemented). This is to reduce diversity and complexity of the user equipment capability so as not to newly implement the PUCCH format 3 for the A/N and the CSI in the case of the user equipment which does not implement the PUCCH format 3, when only the A/N is transmitted. Additionally, in the corresponding user equipment, it may be limited to apply the simultaneous transmission only when two (FDD) cells or more are configured in the corresponding user equipment or additionally it may be limited to apply the simultaneous transmission only when three (FDD) cells or more are configured in the corresponding user equipment.

2) Method permitted for the user equipment having capability of cell aggregation (subcarrier aggregation) (that is, the aggregation of two or more cells): That is, the simultaneous transmission setting of the multi A/N and CSI is to permit implementation of the PUCCH format 3 to the user equipment capable of aggregating up to two FDD cells. In the case of FDD, in one cell situation, since the simultaneous transmission method of the single DL CC A/N and the CSI exists, in the user equipment in which the subcarrier aggregation is not permitted, the simultaneous transmission configuration of the A/N and the CSI for the multi DL CC is not required. In the case of TDD, the simultaneous transmission of the A/N and the CSI for the multi subframes in one CC situation is not considered, and only the simultaneous transmission of the A/N and the CSI for the multi DL CC in the subcarrier aggregation situation is permitted. This is to set the simultaneous transmission of the multi A/N and the CSI even in the user equipment capable of aggregating up to two FDD cells. Here, the permitting of the implementing capability of the PUCCH format 3 to the user equipment capable of aggregating up to two FDD cells is to consider setting only a case having simultaneous transmission capability of the multi A/Ns and the CSIs. In the case where the CSI is dropped and the only the multi A/Ns for two cells are transmitted, since the only the channel selection method is used, the corresponding user equipment needs not to require the PUCCH format 3. Additionally, it may be limited to apply the simultaneous transmission only when two CCs or more are configured in the corresponding user equipment.

3) Method permitted regardless of subcarrier aggregation capability (corresponding to only TDD, and in FDD, in the case of one CC, the application is unnecessary)

2. According to the PUCCH format, whether or not simultaneous transmission of the A/N (and/or the SR) and the CSI for the multi DL CC can be set.

1) Method permitted only in the case where the use of the PUCCH format x is set when only the A/N for the multiple DL CCs exists: The channel selection of the PUCCH format x and the PUCCH format 1a/1b is selectively used according to the CSI to prevent one user equipment from receiving all the corresponding resources.

2) Method permitted even in the case where the use of the PUCCH format 1a/1b channel selection is set when only the A/N for the multiple DL CCs exists: Unlike the 1), the method gives flexibility of the resource selection and may more effectively select resources.

Meanwhile, when there are the user equipment in which the PUCCH format 3 can be implemented and the user equipment in which the PUCCH format 3 cannot be implemented, the PUCCH format 1b channel selection is set for feedback of only the A/N for the plurality of cells (that is, using the PUCCH format 1b channel selection method during the A/N transmission in the case where the CSI subframe is not, and operations of a case where the A/N (mA/N and the CSI for the plurality of cells are set to be transmitted together may be divided as illustrated in the following Table.

TABLE 7

| mA/N + sCSI = TRUE UCI collision | PUCCH format 3 available UE mA/N, sCSI | PUCCH format 3 available UE mA/N, sCSI |
| --- | --- | --- |
| In the case where PUCCH format 3 is set for A/N feedback | Multiplexing in PUCCH format 3 | N/A |
| In the case where channel selection is set for A/N feedback | Multiplexing in PUCCH format 3 | Multiplexing in PUCCH format 2 |

<Simultaneous Transmission Setting of A/N and CSI in the Case of Receiving PUCCH Format 1a/1b Channel Selection by A/N Transmission Method>

In the case of receiving the PUCCH format 1a/1b channel selection as the A/N transmission method, the channel state of the user equipment is not good, and as a result, the PUCCH format 3 may not be set. In this viewpoint, as the A/N transmission method, the "setting the PUCCH format 1a/1b channel selection" and the "setting the simultaneous transmission through the PUCCH format 3 by multiplexing the A/N for the multiple cells and one DL CC or a periodic CSI for the plurality of DL CCs" may not be simultaneously permitted. That is, only in the case of "setting the PUCCH format 3 as the A/N transmission method", the "setting the simultaneous transmission through the PUCCH format 3 by multiplexing the A/N for the multiple cells and one DL CC or a periodic CSI for the plurality of DL CCs" may be permitted.

<Multiplexing with the CSI in the Case of Bundling when the Number of A/N Bits (or Additionally, a Sum of the SR Bits) Exceeds 11 Bits>

In the case of the FDD, when considering a transmission mode in which maximum five cells (CC) are aggregated and two codewords may be transmitted in each cell, the bit number of A/Ns is maximum 10 bits. On the contrary, in the case of the TDD, since the A/Ns for a plurality (M) of DL subframes need to be transmitted in one UL subframe, the bit number of A/Ns is increased in proportion to M. Accordingly, in the case where the simultaneous transmission of the A/N and the CSI is set and the A/N and the CSI are transmitted to the PUCCH format 3, in 22 bits which may be maximally supported by the current PUCCH format 3, the bit number occupied by the A/N (the SR bit may be included) may exceed 11 bits. In this case, a case where the CSI bit which may be generated at the CSI transmission time may not be transmitted may occur. Accordingly, only by a combination of the CSI mode which may be transmitted to CSI transmittable bit number or less in the CSI subframe, it may be limited to apply the simultaneous transmission setting of the A/N and the CSI. For example, in the user equipment, when the number of A/N bits (or additionally, the sum of SR bits) is 14, only the CSI report mode, in which a maximum bit among the CSI report types in the settable CSI mode is 22−14=8 bits or less, may be used in addition to the application of the simultaneous transmission setting of the A/N and the CSI.

<Application of A/N Bundling and Application of Simultaneous Transmission of A/N and CSI>

When the A/N is transmitted to the PUCCH format 3, the channel state of the user equipment is not good, and as a result, a case where the A/N bit number transmitted simultaneously with the CSI needs to be reduced may occur. To this end, the application of the spatial bundling to the A/N (or additionally, application of the time domain bundling) may be set. The bundling setting may be used even in the case where the simultaneous transmission of the A/N and the CSI is set. This is because available transmittable A/N bits decreased due to the multiplexing with the CSI may be decreased. Accordingly, in the case where the 'setting of the bundling' and the 'simultaneous transmission setting of the A/N and the CSI' are simultaneously set, the bundling may be applied during the multiplexing of the multiple A/N and the CSI in the CSI subframe, and in the case of the subframe to which only the A/N is transmitted, the bundling may not be applied. The sum of the A/N and the CSI is possible because an A/N which is not bundled is also possible to transmit.

In this case, the application of the bundling during only the A/N transmission may be determined according to a reference value based on the bit number of CSIs. In the case where the A/N bit number before bundling is larger than (or the same as) the reference value, the bundling is applied, and in the case where the A/N bit number before bundling is smaller than (or the same as) the reference value, the bundling is not applied.

Figure 15:
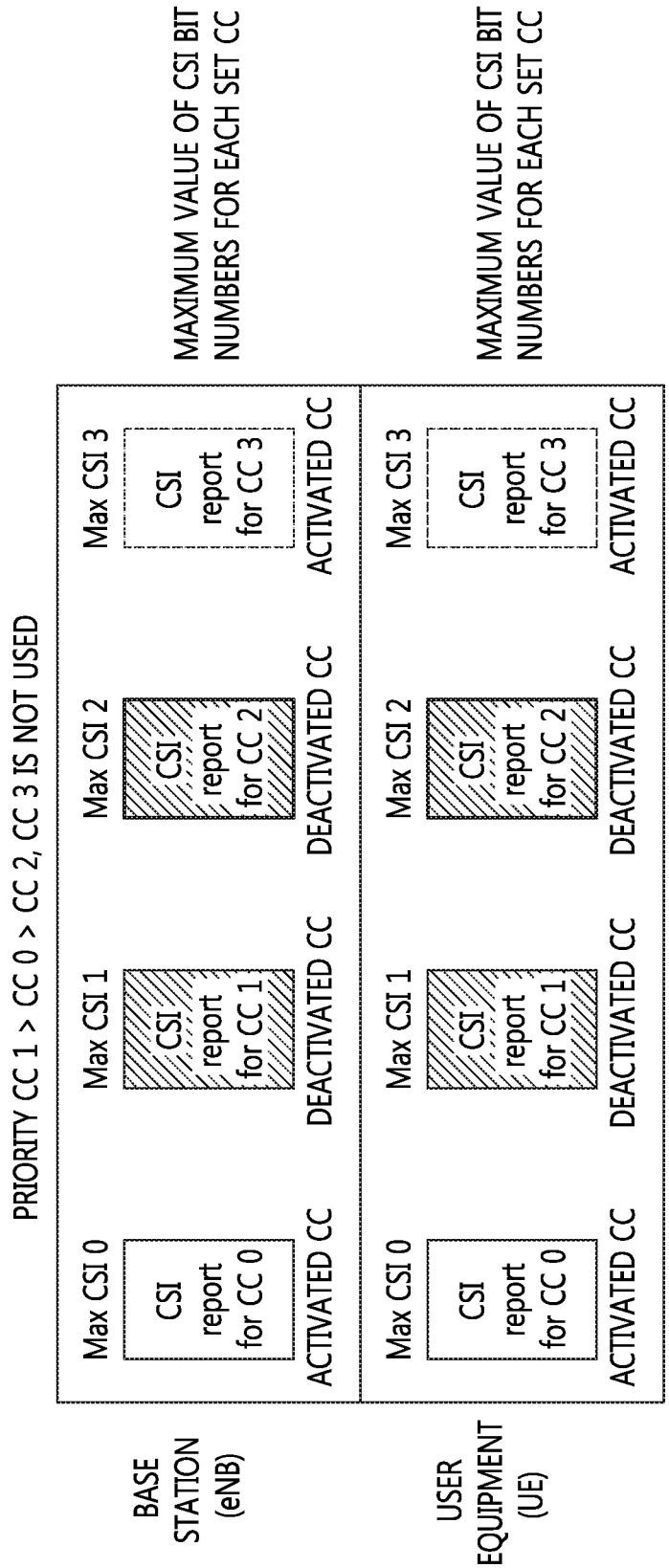
FIG. 15 illustrates an example of determining a reference value regarding whether bundling is applied at the time of transmitting only A/N.

FIG. 15 illustrates an example of determining a reference value regarding whether bundling is applied at the time of transmitting only A/N.

It is assumed that four CCs between the base station and the user equipment are set, and a priority of the CCs is in order of CC1, CC0, and CC2. It is assumed that CC3 is not used.

A maximum value (that is, a maximum value in time/frequency axes) of the CSI bit number to be transmitted to one subframe in each CSI report mode which is set to the DL cells (DL CCs) which are set to the user equipment may be a reference value. That is, when Max CSI0, Max CSI1, and Max CSI 2 are maximum values of the CSI bit number which may be transmitted from one subframe in the CSI report mode set in each CC, the maximum value among them may be the reference value.

After the maximum bit number of the CSI report mode according to a cycle for each cell CC is calculated, since the bit number is set as the maximum value of the values, the implementation may be easily performed by using one value determined when an initial CSI report mode is set without comparison of priority or calculating the maximum value of the CSI number in each subframe. As a simpler method, it may be considered that the maximum CSI bit number (11 bits) transmitted from one subframe is fixed and transmitted in all the CSI report modes.

<Definition of CSI Subframe>

In LTE-A Rel-10, periodic CSI transmission is configured to be independently set for each cell. Meanwhile, some of SCells set to the user equipment may be activated or deactivated. In the case of the deactivated cell, since the data transmission is not performed, the CSI report for the corresponding cell is not required. Accordingly, in an existing LTE-A Rel-10, the "CSI (transmission) subframe" which is a subframe in which the periodic CSI is transmitted to the uplink control channel may be defined as a union of the periodic CSI transmission subframes in the activated cell.

On the contrary, in LTE-A Rel-11, the simultaneous transmission of the A/N (particularly, mA/N) and the CSI may be set, and in this case, when the A/N (particularly, mA/N) and the CSI are transmitted to the PUCCH format 3, in order to prevent ambiguity of a channel coding scheme due to error occurrence for activation/deactivation of the SCell between the base station and the user equipment, even though only a content for the activated cell in an actual content of the CSI is selected and transmitted, the CSI field needs to be set based on the set cell. Accordingly, in this case, the CSI (transmission) subframe may be newly defined as follows.

The CSI report for the activated cell is selected and transmitted in the union of the periodic CSI transmission moment (subframe) in the set cell, herein, the CSI field, and in the case where there is no CSI report of the activated cell corresponding to the corresponding moment, the CSI report may not be transmitted to the reserved CSI field.

In the case where the simultaneous transmission of the A/N and the CSI is set, in the CSI (transmission) subframe, a PUCCH format which is different from the A/N-only subframe (subframe which is a complementary set of the CSI subframe) is used, or the operation may vary. For example, changes in a transmission format of the A/N bit (the channel selection is changed into the PUCCH format 3), an operation and a format during the positive SR (the PUCCH format 1 is changed into the PUCCH format 3), and a detection operation of the ARI of the PDCCH of the DL subframe corresponding to the corresponding UL subframe are possible.

<Configuring Simultaneous Transmission Mode of A/N and CSI>

In the existing system (for example, LTE-A release 10), simultaneous transmission of a single ACK/NACK (sA/N) and the CSI may be set. The setting may be performed by a parameter of 'simultaneousAckNackAndCQI' included in the RRC message. Meanwhile, in a new system (for example, LTE-A release 11), simultaneous transmission of an ACK/NACK for a plurality of cells, that is, a multiple ACK/NACK (mA/N) and the CSI may be set. The operation is a setting which is not included in the existing system, and in the present invention, an addition of a new parameter for the simultaneous transmission setting of the mA/N and the CSI is proposed. The new parameter may be included in the RRC message applied to the new system, and the title of the new parameter is called 'simultaneousAckNackAndCQI-Format3-R11'. That is, the simultaneous transmission setting of the mA/N and the CSI may be performed through the new parameter. Since the 'simultaneousAckNackAndCQI-Format3' is included in the LTE-A Rel-11, the 'simultaneousAckNackAndCQI-Format3-r11' is represented as the 'simultaneousAckNackAndCQI-r11'.

The existing 'simultaneousAckNackAndCQI' has a value of true or false, as a parameter included in the RRC message (that is, the CQI-ReportConfig information element). In the case where the parameter is True, the simultaneous transmission of the ACK/NACK and the CQI is permitted.

Meanwhile, the 'simultaneousAckNackAndCQI-Format3' also has a value of true or false, as a parameter included in the RRC message. The parameter may indicate whether the user equipment multiplexes the ACK/NACK and the periodic CQI to transmit the ACK/NACK and the periodic CQI to the specific PUCCH format, for example, the PUCCH format 3.

A reason that the base station needs to transmit the new parameter will be described in detail with reference to FIG. 16.

Figure 16:
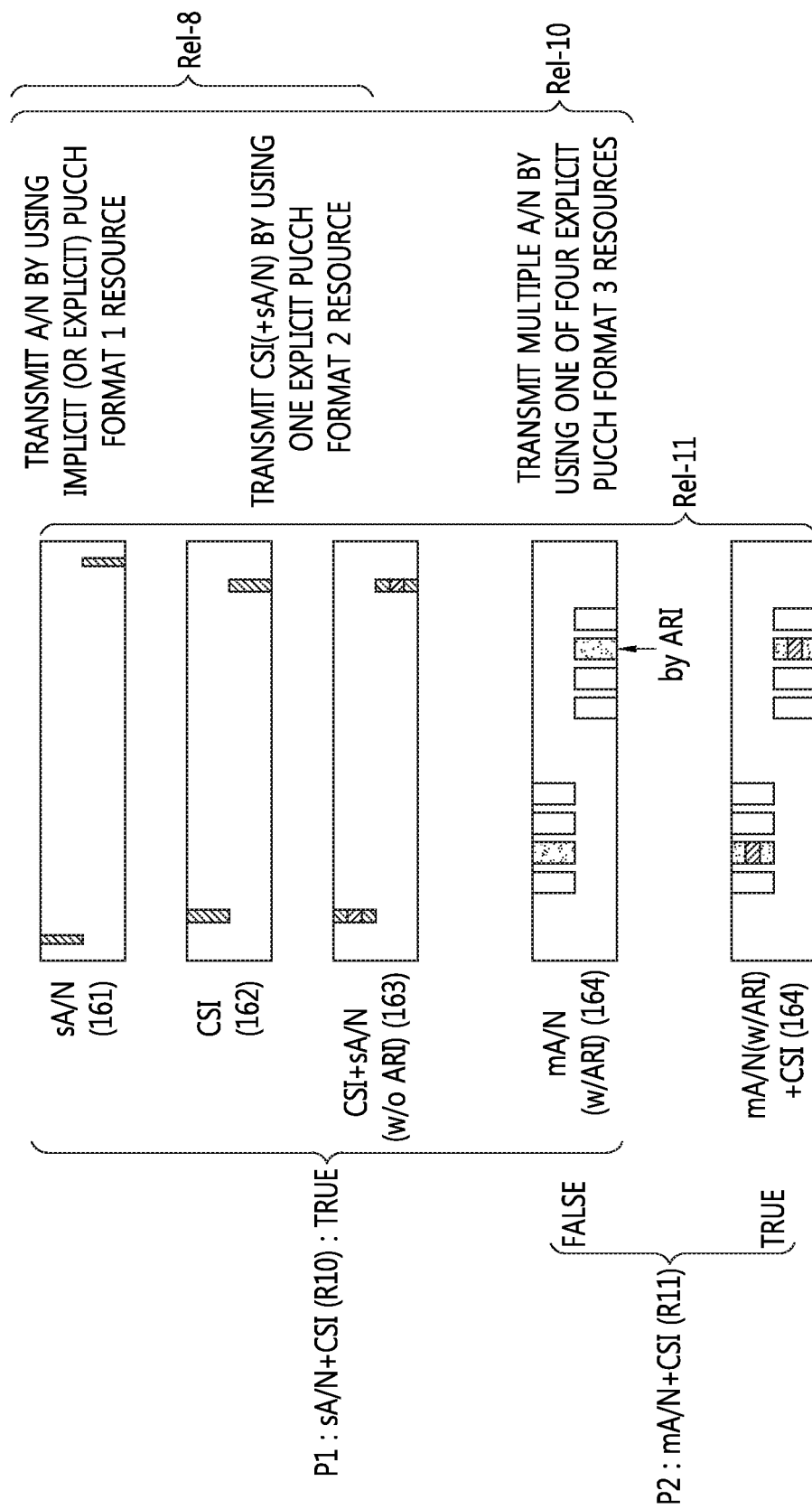
FIG. 16 illustrates an operation of a terminal depending on setting P1 and P2.

FIG. 16 illustrates an operation of a terminal depending on setting P1 and P2. In FIG. 16, P1 is 'simultaneousAckNackAndCQI', and P2 is 'simultaneousAckNackAndCQI-Format3-R11'.

Referring to FIG. 16, in the case where an existing P1 parameter is TRUE, the user equipment transmits a single A/N 161 through the PUCCH format 1a/1b if only the single A/N exists in the corresponding subframe. If only the CSI exists, a CSI 162 is transmitted through the PUCCH format 2, and when the CSI and the single A/N 163 exist, the CSI and the single A/N are simultaneously transmitted through the PUCCH format 2a/2b. In addition, in the case where a multiple A/N 164 and the CSI collide with each other, the CSI is dropped and the multiple A/N is transmitted through the PUCCH format 3. The PUCCH format 3 is transmitted from a resource indicated by the ARI (using the TPC field) of the PDCCH among four explicit resources set by the RRC message.

That is, in an existing wireless communication system, the aforementioned four operations are supported, and the user equipment performs the operation according to occurrence of the A/N and the CSI in the subframe which transmits the UCI.

However, in a new wireless communication system, in the case where the multiple A/N (mA/N) and the CSI collide with each other, the simultaneous transmission of the multiple A/N and the CSI may be supported. Accordingly, in order to support the new operation, the P2 parameter needs to be introduced. If the new parameter is not introduced and the simultaneous transmission of the multiple A/N and the CSI is set by the existing parameter P1, the malfunction of the user equipment may occur. For example, like the exiting case, when the existing parameter P1 is transmitted from the base station which does not support the simultaneous transmission of the multiple A/N and the CSI, in the user equipment which supports the multiple A/N and the CSI, uncertainty for whether the simultaneous transmission of the multiple A/N and the CSI is applied occurs. The reason of the uncertainty is that the user equipment transmits information on the operation supported by the user equipment to the network, while the network does not notify information on an operation supported by the base station to the user equipment.

Figure 17:
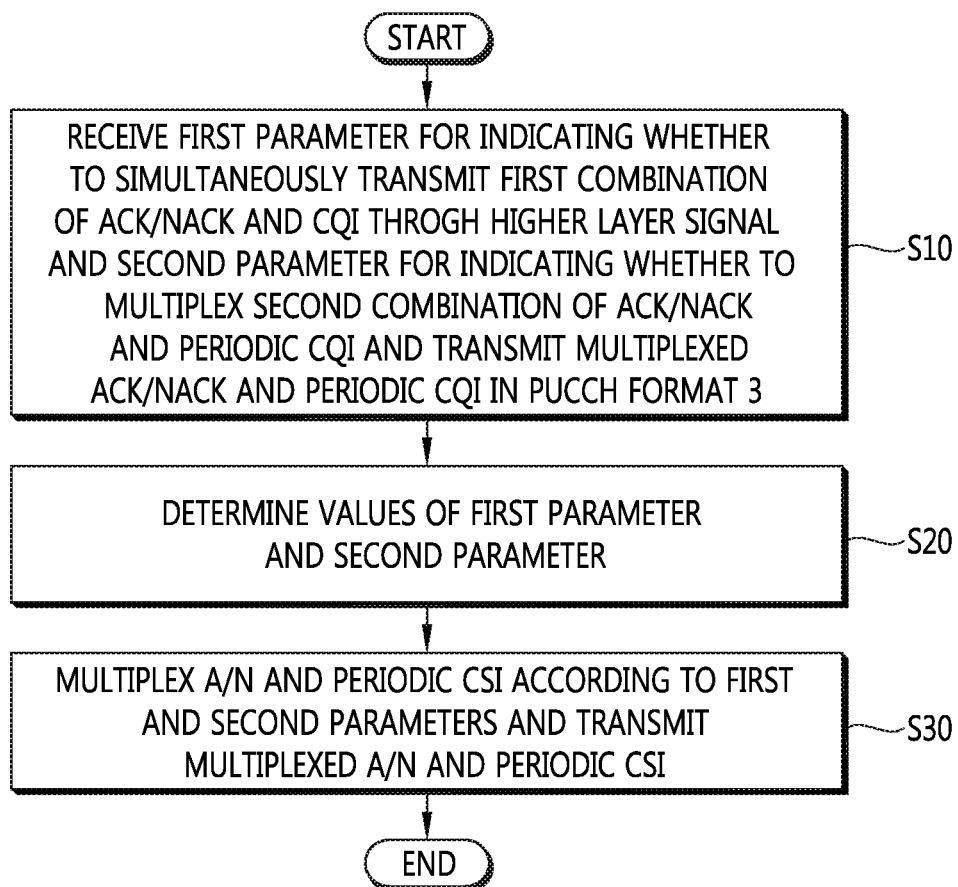
FIG. 17 illustrates an operation method of a terminal according to an embodiment of the present invention.

The operation of the user equipment may vary according to whether the P2 parameter is TRUE or FALSE. That is, in the case where the P2 parameter is TRUE, the multiple A/N and the CSI 165 are multiplexed to be transmitted through the PUCCH format 3. FIG. 17 illustrates an operation method of a terminal according to an embodiment of the present invention.

Referring to FIG. 17, the user equipment receives a first parameter indicating whether a (first set of) A/N and a CSI are simultaneously transmitted and a second parameter indicating whether a (second set of) A/N and a periodic CSI are multiplexed to be transmitted to the PUCCH format 3 (S10).

In the FDD, the first set of A/N may be an A/N (A) when one PDSCH exists only in the PCC and is scheduled without the PDCCH (to the SPS), (B) when one PDSCH exists only in the PCC and is scheduled to the PDCCH, or (C) when one PDCCH exists only in the PCC and the PDCCH requires the A/N response (ex. PDCCH notifying the DL SPS release), and the second set of A/N may be other A/N sets.

In the TDD, the first set of A/N may be an A/N (A) when a PDSCH scheduled without the PDCCH (to the SPS) exists only in the PCC and there is no PDCCH (ex. DL SPS release PDCCH) requiring the A/N response, (B) one PDSCH scheduled by a PDCCH exists only in the PCC and DAI=1 of the PDCCH, or (C) one PDCCH (ex. DL SPS release PDCCH) which is DAI=1 requiring the A/N response exists and there is no PDSCH, and the second set of A/N may be an A/N set other than the (A), (B), and (C) and when 'the PDCCH (ex DL SPS release PDCCH) which is DAI=1 requiring the A/N response exists', 'one PDSCH scheduled by a PDCCH exists only in the PCC and DAI=1 of the PDCCH, and "one PDSCH scheduled without the PDCCH (to the SPS) exists".

The second parameter may be transmitted by the base station only in the case where the second set of ACK/NACK is set to be transmitted to the specific PUCCH format (for example, the PUCCH format 3).

The first parameter may be 'simultaneousAckNackAndCQI', and the second parameter may be 'simultaneousAckNackAndCQI-Format3-r11'. The higher layer signal may be the RRC message.

The user equipment determines values of the first parameter and the second parameter (S20) to multiplex and transmit the A/N and the periodic CSI according to the values of the first parameter and the second parameter (S30).

For example, the first set of ACK/NACK or the second set of ACK/NACK is multiplexed with the CQI based on the first parameter and the second parameter to be transmitted through the first PUCCH format (the first set of ACK/NACK+periodic CQI) or the second PUCCH format (the second set of ACK/NACK+periodic CSI). The first PUCCH format may be the PUCCH format 2/2a/2b, and the second PUCCH format may be the PUCCH format 3.

Hereinafter, a method in which enhanced user equipment operates in LTE-A Rel-11 at the time of receiving a P1 parameter (first parameter) and a P2 parameter (second parameter) will be described in more detail.

The enhanced user equipment may use the existing parameter ('simultaneousAckNackAndCQI') and a new parameter ('simultaneousAckNackAndCQI-R11') as separate parameters. For example, when simultaneousAckNackAndCQI-R11=true and simultaneousAckNackAndCQI=true, sA/N transmission may operate similarly as that in the case of simultaneousAckNackAndCQI=true.

In addition, when simultaneousAckNackAndCQI-R11=true and simultaneousAckNackAndCQI=false, the mA/N and the CSI are transmitted in the PUCCH format 3 and the sA/N transmission may operate similarly as that in the case of simultaneousAckNackAndCQI=false.

In detail, in the TDD, 'simultaneousAckNackAndCQI' is set as TRUE and the PUCCH format 1b channel selection is configured for the user equipment and the user equipment drops the CSI and transmits the HARQ-ACK (A/N) when receiving at least one PDSCH in subframe n-k (k∈K, is the same as K described above) of the SCell.

In the TDD, in the case where 'simultaneousAckNackAndCQI' is set as TRUE or 'simultaneousAckNackAndCQI-Format3-r11' is set as TRUE, and the PUCCH format 3 is configured for the user equipment, {'simultaneousAckNackAndCQI' is set as TRUE and 'simultaneousAckNackAndCQI-Format3-r11' is set as FALSE} or {'simultaneousAckNackAndCQI' is set as TRUE and 'simultaneousAckNackAndCQI-Format3-r11' is set as TRUE and the PUCCH resource is not determined by the ARI}, i) when one PDSCH scheduled without the PDCCH exists only in the PCC and there is no PDCCH (a PDCCH that indicates the downlink SPS release) that requires the A/N response, or ii) when one PDSCH scheduled by a PDCCH exists only in the primary cell (PCC) and the DAI of the PDCCH is 1, or iii) when one PDCCH (for example, the downlink SPS release PDCCH, hereinafter, the same) having the DAI of 1, which requires the A/N response exists, the user equipment transmits the CSI and the A/N by using the PUCCH format 2/2a/2b.

Else if 'simultaneousAckNackAndCQI-Format3-r11' is set as TRUE and the PUCCH resource is determined by the ARI (that is, one resource is determined by a specific field of the PDCCH among four predetermined resources configured by the RRC message, and if the total numbers of bits of the A/N, the SR (if the SR exists) are not larger than 22 or the total numbers of bits of spatially bundled A/N, SR (if the SR exists), and CSI are not larger than 22, the user equipment transmits the A/N, the SR (if the SR exists), and the CSI through the PUCCH format 3.

Else, the user equipment drops the CSI and transmits the A/N.

Only when the user equipment transmits only the positive SR, the user equipment transmits the positive SR by using the PUCCH format 1.

It is presumed that in the FDD, two or more serving cells are configured for the user equipment, periodic CSI reporting and transmission of the A/N collide with each other in the same subframe and there is no PUSCH transmission in the subframe.

In this case, if 'simultaneousAckNackAndCQI' is set as TRUE and [the A/N corresponds to the PDSCH transmission or corresponds to the PDCCH that indicates the downlink SPS release only in the primary cell] and the user equipment is not configured in the PUCCH format 3, or the user equipment is configured in the PUCCH format 3 and 'simultaneousAckNackAndCQI-Format3-r11' is set as FALSE, or the user equipment is configured in the PUCCH format 3 and 'simultaneousAckNackAndCQI-Format3-r11' is set as TRUE and the PUCCH resource is not determined by the ARI, the user equipment multiplexes the A/N and the periodic CSI by using the PUCCH format 2/2a/2b.

Else if, the user equipment is configured in the PUCCH format 3 and 'simultaneousAckNackAndCQI-Format3-r11' is set as TRUE and the PUCCH resource is determined by the ARI, and if the total numbers of bits of the A/N, the SR (if the SR exists) are not larger than 22 or the total numbers of bits of spatially bundled A/N, SR (if the SR exists), and CSI are not larger than 22, the user equipment multiplexes the periodic CSI and the A/N to transmit the multiplexed periodic CSI and A/N through the PUCCH format 3.

Else, the user equipment drops the CSI.

The following table shows setting the P1 and P2 parameters and an operation of the user equipment at that time in the RRC message. That is, when the aforementioned process is briefly illustrated, the aforementioned process may be illustrated as given in Table 8.

TABLE 8

| | simultaneousAckNackAndCQI = FALSE | simultaneousAckNackAndCQI = TRUE |
|---|---|---|
| simultaneousAckNackAndCQI-Format3-r11 = FALSE | Similar as an operation depending on LTE-A Rel-10 when simultaneousAckNackAndCQI = FALSE | Similar as an operation depending on LTE-A Rel-10 when simultaneousAckNackAndCQI = TRUE |
| simultaneousAckNackAndCQI-Format3-r11 = TRUE | Based on the operation depending on LTE-A Rel-10 when simultaneousAckNackAndCQI = FALSE. That is, the HARQ-ACK and the CSI are multiplexed and transmitted in the PUCCH format 3 indicated by the ARI | Based on the operation depending on LTE-A Rel-10 when simultaneousAckNackAndCQI = TRUE. That is, the HARQ-ACK and the CSI are multiplexed and transmitted in the PUCCH format 3 indicated by the ARI |
| PUCCH format 3 is allocated instead of PUCCH format 2 for transmitting only CSI | The configuration between the PUCCH format 3 and the PUCCH format 2 is changeable. When a fixed resource in which the PUCCH format 3 is RRC-configured is used to transmit only the CSI, only the CSI is transmitted or HARQ-ACK (w/o ARI) and the CSI are multiplexed to be transmitted in the PUCCH format 3. | |

In the aforementioned method, as the PUCCH resource used when only the CSI is transmitted or the sA/N and the CSI are simultaneously transmitted, using the PUCCH format 3 instead of the PUCCH format 2/2a/2b may be determined depending on whether the PUCCH format 3 resource being allocated for transmitting only the CSI.

<Method for Allocating Resource for Simultaneous Transmission of the A/N and the CSI when the PUCCH Format 1b Channel Selection is Configured for Feeing Back the A/N>

A case in which the PUCCH format 3 is used to transmit only the A/N for the plurality of cells or for simultaneously the A/N and the CSIs for the plurality of cells is referred to as CASE 1.

A case in which the PUCCH format 1b channel selection is used to transmit only the A/N for the plurality of cells and the PUCCH format 3 is used to simultaneously transmit the A/N and the CSIs for the plurality of cells is referred to as CASE 2. In the case of CASE 2, the PUCCH format 3 is used only in a CSI transmission subframe. Accordingly, consumption of the PUCCH format resource is decreased.

Further, the CSI transmission subframe may be configured with a time difference between the plurality of user equipments. Accordingly, the user equipment may more easily share the resource. Therefore, in the case of the PUCCH format 3 resource, only one resource may be allocated through the RRC and the resource may be continuously used.

CASE 2 is distinguished from CASE 1 in which a plurality of resources (four resources) is allocated through the RRC and one resource indicated by the ARI included in the PDCCH, among the plurality of resources is used.

In CASE 1, the resource may be used even when the PUCCH format 3 is not the CSI subframe. Therefore, it is preferable that the plurality of user equipments share the PUCCH resource to be selectively indicated by the ARI.

In the case of CASE 2, although only one resource designated by the RRC is used, whether to receive the values of the sA/N, the mA/N, and the ARI may be used to designate selection of the PUCCH format through which the CSI is to be transmitted. For example, when the ARI is received, the mA/N is transmitted by using the PUCCH format 3 and when the ARI is not received, the sA/N is transmitted by using the PUCCH format 2.

<Method for Signaling and Processing RRC Resource Upon Simultaneously Transmitting the A/N and the CSI>

When CASE 1 is applied, the PUCCH format 3 may be used for feeding back only the A/N for the plurality of cells. In this case, a plurality of PUCCH format 3 resources is configured through the RRC message. Therefore, configuring the PUCCH format 3 resource for simultaneously transmitting the A/N for the plurality of cells and the CSI is not required.

On the contrary, when CASE 2 is applied, the PUCCH format 1 channel selection may be used for feeding back only the A/N for the plurality of cells. In this case, the PUCCH format 3 resource is not allocated. Therefore, when the A/N and the CSI for the plurality of cells are configured to be simultaneously transmitted, allocating the PUCCH format 3 resource is required.

When the feedback method of only the A/N and the feedback method when the A/N and the CSIs for the plurality of cells are simultaneously transmitted are independently configured, allocating the PUCCH format 3 resource for simultaneously transmitting the A/N and the CSI is required for CASE 2.

When the PUCCH format 3 is configured by the feedback method of only the A/N for the plurality of cells at the time of configuring CASE 1, it is necessary to determine which one of the PUCCH format 3 resource allocation and PUCCH format 3 resource allocation configured at the time of simultaneously transmitting the A/N and the CSI.

1) Values in both cases may be configured to be the same as each other, 2) a resource allocation index of CASE A may be continuously used and other resource allocation indexes may be disregarded, 3) a resource allocation index of CASE B may be continuously used and other resource allocation indexes may be disregarded, or 4) a resource allocation index of CASE A or B changed in recent years may be used.

<Configuring Simultaneous Transmission Mode of Multiple CSIs>

In the existing system, periodic CSIs for a plurality of downlink cells configured for the user equipment may not be simultaneously transmitted in one UL subframe and only one selected CSI is transmitted and residual CSIs are dropped.

However, in a future system, simultaneous transmission of multiple CSIs (that is, the plurality of CSIs for the plurality of cells) may be permitted.

The simultaneous transmission of the multiple CSIs may be configured by an RRC parameter (for example, 'multi-CellCQI-R12'). An operation when the PUCCH format 3 is used for transmitting the multiple CSIs.

Figure 18:
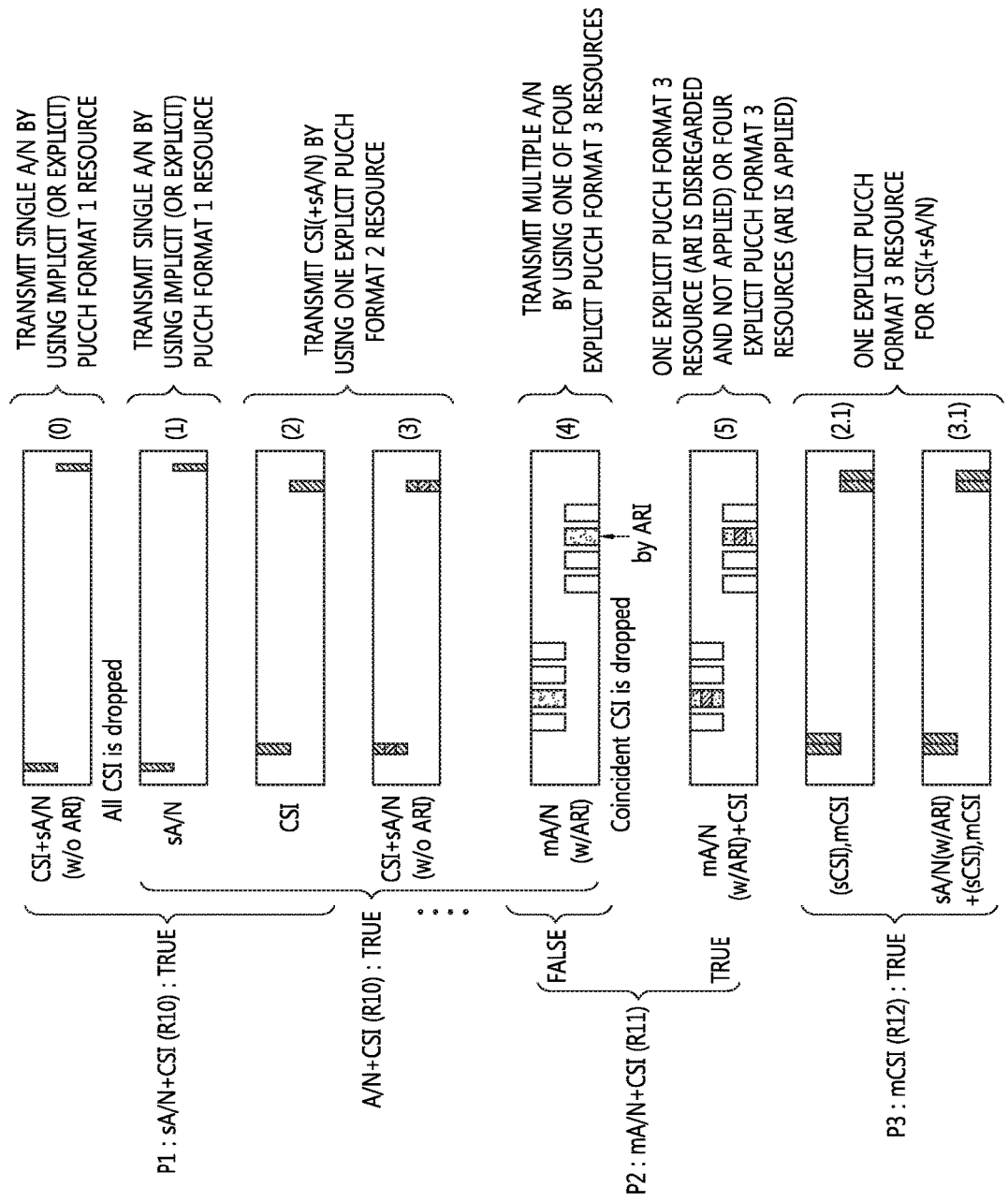
FIG. 18 illustrates a case in which the terminal transmits a UCI according to three RRC parameters.

FIG. 18 illustrates a case in which the terminal transmits a UCI according to three RRC parameters. In FIG. 18, P1 is 'simultaneousAckNackAndCQI' and P2 is 'simultaneousAckNackAndCQI-Format3-R11'. P3 may be 'multiCellCQI-r12' that represents whether to simultaneously transmit the multiple CSIs. Operations represented by (0) to (5) in FIG. 18 have been described in FIG. 16. In FIG. 18, (2.1) represents that the multiple CSIs are transmitted through the explicit PUCCH format 3 resource when only the multiple CSIs are generated in the case where P3 is set as TRUE. In FIG. 18, (3.1) represents that the multiple CSIs and the single A/N are transmitted through the explicit PUCCH format 3 resource when the P3 is set as TRUE and the multiple CSIs and the single A/N collide with each other.

AltA: User equipment operated by Rel-11 may constitute as separate parameters simultaneousAckNackAndCQI-R11 and multiCellCQI-R12. In this case, the user equipment operates as illustrated in FIG. 16 when simultaneousAckNackAndCQI-R11=TRUE and multiCellCQI-R12=FALSE. When simultaneousAckNackAndCQI-R11=TRUE and multiCellCQI-R12=TRUE, the user equipment performs the operation in the case of using the PUCCH format 3 for transmitting the multiple CSIs described in <Selection of transmission resource depending on UCI combination upon configuring simultaneous transmission of A/N and CSI>.

AltB: The user equipment operated by Rel-11 performs the operations (2.1) and (3.1) of FIG. 18 and performs operations (1) and (5) without a separate RRC parameter simultaneousAckNackAndCQI-R11, when multiCellCQI-R12=TRUE. However, even when only the single CSI is generated, (2.1) and (3.1) may be applied as they are or only when only the single CSI is generated, the operations (1) and (5) may be substituted with (2) and (3). Herein, simultaneousAckNackAndCQI may be set as TRUE (alternatively, disregarded). When multiCellCQI-R12=FALSE, the user equipment performs the operation when simultaneousAckNackAndCQI=FALSE. That is, the user equipment performs the operations. (1), (2), (0), and (4). Herein, simultaneousAckNackAndCQI may be set as FALSE (alternatively, disregarded). Further, multiCellCQI-R12 may be substituted with simultaneousAckNackAndCQI (override to the same RRC field).

AltC: The user equipment operated by Rel-11 performs the operation (2.1) of FIG. 18 and performs operations (1), (3), and (5) without the separate RRC parameter simultaneousAckNackAndCQI-R11, when multiCellCQI-R12=TRUE. However, even when only the single CSI is generated, (2.1) may be applied as it is or only when only the single CSI is generated, the operations (1), (3), and (5) may be substituted with (2). Herein, simultaneousAckNackAndCQI may be set as TRUE (alternatively, disregarded). When multiCellCQI-R12=FALSE, the user equipment performs the operation when simultaneousAckNackAndCQI=FALSE. That is, the user equipment performs the operations (1), (2), (0), and (4). Herein, simultaneousAckNackAndCQI may be set as FALSE (alternatively, disregarded). Further, multiCellCQI-R12 may be substituted with simultaneousAckNackAndCQI (override to the same RRC field).

AltD: The user equipment operated by Rel-11 performs the operations (2.1) and (3.1) of FIG. 18 (even when only the single CSI is generated, (2.1) and (3.1) may be applied as they are or only when only the single CSI is generated, the operations (1) and (5) may be substituted with (2) and (3)) and performs operations (2) and (3) when multiCellCQI-R12=FALSE. Additionally, the user equipment operates according to the separate RRC parameter simultaneousAckNackAndCQI-R11 and when this value is TRUE, the user equipment performs the operations (1) and (5) and when this value is FALSE, the user equipment performs the operations (1) and (4).

AltE: The user equipment operated by Rel-11 performs the operation (2.1) of FIG. 18 (even when only the single CSI is generated, (2.1) may be applied as it is or only when only the single CSI is generated, the operations (1), (3), and (5) may be substituted with (2)) and performs the operation (2) when multiCellCQI-R12=FALSE. Additionally, the user equipment operates according to the separate RRC parameter simultaneousAckNackAndCQI-R11 and when this value is TRUE, the user equipment performs the operations (1) and (3.1) or (3) and (5) and when this value is FALSE, the user equipment performs the operations (1), (0), and (4). Herein, in the case of applying and selecting (3.1) or (3), one may be fixedly applied regardless of the multiple CSIs or the single CSI or application of (3.1) or (3) may be selected according to the multiple CSI (3.1) or the single CSI (3).

In the AltD and AltE, multiCellCQI-R12 and simultaneousAckNackAndCQI may be overridden with parameters or set as separate parameters and made to be correlated with each other (alternatively, disregarded) or set as independent parameters. When multiCellCQI-R12 and simultaneousAckNackAndCQI are set as the independent parameters, multiCellCQI-R12 is applied to selection of (5)-TRUE and (4)-FALSE and simultaneousMultiCellCQI is applied to selection of (3)-TRUE and (0)-FALSE.

In the above description of the present invention, the time-domain bundling includes application of the logic AND operation to the ACK that exists in the time domain, the ACK counter for transmitting the total number of ACKs, or the contiguous ACK counter for transmitting only the number of ACKs which are contiguous from the ACK corresponding to the first DAI value. Configuring the A/N and the CSI (that is, configuring the simultaneous transmission of the A/N and the CSI) means that the multi-cell A/N and 'the periodic CSI for the single DL CC or the plurality of DL CCs' are configured to be multiplexed to be simultaneously transmitted in the PUCCH format 3. The multi-cell A/N (A/N for the plurality of DL CCs) means an A/N (alternatively, an A/N in the case of receiving from the PDCCH the ARI for selecting the PUCCH format 3 or the explicit PUCCH format 1a/1b) when the A/N for the SCell DL CC is included. Configuring the sA/N and the CSI means configuring the simultaneous transmission of the single A/N and the CSI of Rel-10 in which the multi-cell A/N and CSI are not permitted to be simultaneously transmitted. The single A/N means the A/N for the PCell DL CC (alternatively, an A/N when the ARI for selecting the PUCCH format 3 or the explicit PUCCH format 1a/1b is not received from the PDCCH).

Figure 19:
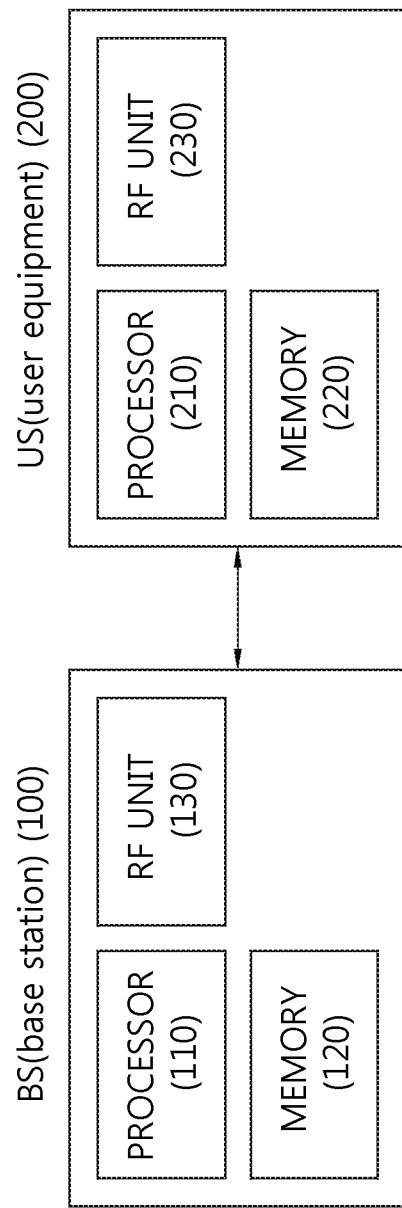
FIG. 19 is a block diagram illustrating a base station and a terminal in which the embodiment of the present invention is implemented.

FIG. 19 is a block diagram illustrating a base station and a terminal in which the embodiment of the present invention is implemented.

A base station 100 includes a processor 110, a memory 120, and a radio frequency (RF) unit 130. The processor 110 implements a function, a process, and/or a method which are proposed. Layers of a wireless interface protocol may be implemented by the processor 110. The processor 110 may notify a UCI transmitting method of a user equipment by transmitting a first parameter and a second parameter through a higher layer signal such as an RRC message. The memory 120 is connected with the processor 110 to store various pieces of information for driving the processor 110. The RF unit 130 is connected with the processor 110 to transport and/or receive the radio signal.

A UE 200 includes a processor 210, a memory 220, and an RF unit 230. The processor 210 implements a function, a process, and/or a method which are proposed. Layers of a wireless interface protocol may be implemented by the processor 210. The processor 210 receives a first parameter and a second parameter through a higher layer signal and multiplexes an ACK/NACK and periodic CSI according to the values to transmit the multiplexed ACK/NACK and the periodic CSI through a specific PUCCH format. The memory 220 is connected with the processor 210 to store various pieces of information for driving the processor 210. The RF unit 230 is connected with the processor 210 to transport and/or receive the radio signal.

The processors 110 and 210 may include an application-specific integrated circuit (ASIC), another chip set, a logic circuit and/or a data processing apparatus. The memories 120 and 220 may include a read-only memory (ROM), a random access memory (RAM), a flash memory, a memory card, a storage medium, and/or another storage device. The RF units 130 and 230 may include a baseband circuit for processing the radio signal. When the embodiment is implemented by software, the aforementioned technique may be implemented by a module (a process, a function, and the like) that performs the aforementioned function. The module may be stored in the memories 120 and 220, and executed by the processors 110 and 210. The memories 120 and 220 may be provided inside or outside the processors 110 and 210 and connected with the processors 110 and 210 by various well-known means.

What is claimed is:

1. A method performed by a user equipment (UE) in a wireless communication system, the method comprising:
receiving first information and second information; and
transmitting, based on whether the first information is set true or set false, first acknowledgment/negative-acknowledgement (ACK/NACK) information and channel quality information through a first physical uplink control channel (PUCCH) format or second ACK/

NACK information and the channel quality information through a second PUCCH format,
wherein the first information informs whether simultaneous transmission of the first ACK/NACK information and the channel quality information is allowed to the UE, and the second information informs whether the UE performs simultaneous transmission of the second ACK/NACK information and the channel quality information multiplexing on the second PUCCH format,
wherein based on the first information being set true and based on the first ACK/NACK information corresponding to a physical downlink control channel (PDCCH) indicating downlink semi-persistent scheduling (SPS) release and a downlink assignment index (DAI) value in the PDCCH being equal to 1, the channel quality information and the first ACK/NACK information are transmitted through the first PUCCH format, and
based on the first information being set false, the second information being set true and one PUCCH resource being determined among four resources configured by a higher layer signal, and a total number of bits corresponding to the second ACK/NACK information and the channel quality information being not larger than a specific value, the second ACK/NACK information and the channel quality information are transmitted through the second PUCCH format.

2. The method of claim 1, wherein the first information and the second information are received through a radio resource control (RRC) message and each has a value of TRUE or FALSE.

3. The method of claim 1, wherein 1-bit or 2-bit ACK/NACK information is transmitted through the first PUCCH format.

4. The method of claim 1, wherein the second information is included in a radio resource control (RRC) message only based on the second information is set in advance so that the second ACK/NACK information is transmitted in the second PUCCH format.

5. The method of claim 1, wherein:
based on the wireless communication system is a frequency division duplex (FDD) system, the first ACK/NACK information is an ACK/NACK for:
a case in which one physical downlink shared channel (PDSCH) exists only in a primary cell in which the UE performs an initial connection establishment procedure or a connection reestablishment procedure with a base station and is semistatically scheduled without a physical downlink control channel (PDCCH),
a case in which one PDSCH exits only in the primary cell and is scheduled by a PDCCH, or
a case in which one PDCCH exists only in the primary cell and an ACK/NACK response is required, and
wherein the second ACK/NACK information is other ACK/NACK combination.

6. The method of claim 1, wherein:
based on the wireless communication system is a time division duplex (TDD) system, the first ACK/NACK information is an ACK/NACK for:
i) a case in which based on a physical downlink shared channel (PDSCH) semistatically scheduled without the physical downlink control channel (PDCCH) exists only in a primary cell in which the UE performs a initial connection establishment procedure or a connection reestablishment procedure with the base station and there is no PDCCH requiring the ACK/NACK response,
ii) a case in which one PDSCH scheduled by a PDCCH in which a downlink assignment index (DAI) is 1 exists only in the primary cell, or
iii) a case in which one PDCCH, requiring the ACK/NACK response, in which the downlink assignment index is 1 exists and there is no PDSCH, and
wherein the second ACK/NACK information is an ACK/NACK combination in a case other than the cases i), ii), iii), and where the PDCCH in which the downlink assignment index is 1, which requires the ACK/NACK response exists, a PDSCH scheduled through a PDCCH in which the downlink assignment index is 1 exits only in the primary cell and one PDSCH semistatically scheduled without the PDCCH exists.

7. The method of claim 1, wherein the channel quality information is configured to be periodically transmitted.

8. The method of claim 1, wherein:
based on the first information has a value of FALSE, and based on the second information has a value of FALSE, the channel quality information is dropped and only the second ACK/NACK information is transmitted through the second PUCCH format.

9. User equipment (UE), comprising:
a transceiver transmitting or receiving a radio signal; and
a processor connected with the transceiver,
wherein the processor:
receives first information and second information; and
transmits, based on whether the first information is set true or set false, first acknowledgment/negative-acknowledgement (ACK/NACK) information and channel quality information through a first physical uplink control channel (PUCCH) format or second ACK/NACK information and the channel quality information through a second PUCCH format,
wherein the first information informs whether simultaneous transmission of the first ACK/NACK information and the channel quality information is allowed to the UE, and the second information informs whether the UE performs simultaneous transmission of the second ACK/NACK information and the channel quality information multiplexing on the second PUCCH format,
wherein based on the first information being set true and based on the first ACK/NACK information corresponding to a physical downlink control channel (PDCCH) indicating downlink semi-persistent scheduling (SPS) release and a downlink assignment index (DAI) value in the PDCCH being equal to 1, the channel quality information and the first ACK/NACK information are transmitted through the first PUCCH format, and
based on the first information being set false, the second information being set true and one PUCCH resource being determined among four resources configured by a higher layer signal, and a total number of bits corresponding to the second ACK/NACK information and the channel quality information being not larger than a specific value, the second ACK/NACK information and the channel quality information are transmitted through the second PUCCH format.

10. The UE of claim 9, wherein the first information and the second information are received through a radio resource control (RRC) message and each has a value of TRUE or FALSE.

11. The UE of claim 9, wherein 1-bit or 2-bit ACK/NACK information is transmitted through the first PUCCH format.

12. The UE of claim 9, wherein the second information is included in a radio resource control (RRC) message only based on the second information is set in advance so that the second ACK/NACK information is transmitted in the second PUCCH format.

13. The UE of claim 9, wherein:
based on a wireless communication system is a frequency division duplex (FDD) system, the first ACK/NACK information is an ACK/NACK for:
a case in which one physical downlink shared channel (PDSCH) exists only in a primary cell in which the UE performs an initial connection establishment procedure or a connection reestablishment procedure with a base station and is semistatically scheduled without a physical downlink control channel (PDCCH),
a case in which one PDSCH exits only in the primary cell and is scheduled by a PDCCH, or
a case in which one PDCCH exists only in the primary cell and an ACK/NACK response is required, and
wherein the second ACK/NACK information is other ACK/NACK combination.

14. The UE of claim 9, wherein:
based on a wireless communication system is a time division duplex (TDD) system, the first ACK/NACK information is an ACK/NACK for:
i) a case in which based on a physical downlink shared channel (PDSCH) semistatically scheduled without the physical downlink control channel (PDCCH) exists only in a primary cell in which the UE performs a initial connection establishment procedure or a connection reestablishment procedure with the base station and there is no PDCCH requiring the ACK/NACK response,
ii) a case in which one PDSCH scheduled by a PDCCH in which a downlink assignment index (DAI) is 1 exists only in the primary cell, or
iii) a case in which one PDCCH, requiring the ACK/NACK response, in which the downlink assignment index is 1 exists and there is no PDSCH, and
wherein the second ACK/NACK information is an ACK/NACK combination in a case other than the cases i), ii), iii), and where the PDCCH in which the downlink assignment index is 1, which requires the ACK/NACK response exists, a PDSCH scheduled through a PDCCH in which the downlink assignment index is 1 exits only in the primary cell and one PDSCH semistatically scheduled without the PDCCH exists.

15. The UE of claim 9, wherein the channel quality information is configured to be periodically transmitted.

16. The UE of claim 9, wherein:
based on the first information has a value of FALSE, and based on the second information has a value of FALSE, the channel quality information is dropped and only the second ACK/NACK information is transmitted through the second PUCCH format.

\* \* \* \* \*